United States Patent
Jacobs et al.

(10) Patent No.: US 8,312,230 B2
(45) Date of Patent: Nov. 13, 2012

(54) DYNAMIC CONTROL OF PARTITION MEMORY AFFINITY IN A SHARED MEMORY PARTITION DATA PROCESSING SYSTEM

(75) Inventors: Stuart Z. Jacobs, Lakeville, MN (US); David A. Larson, Rochester, MN (US); Wade B. Ouren, Rochester, MN (US); Edward C. Prosser, Rochester, MN (US); Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 12/403,440

(22) Filed: Mar. 13, 2009

(65) Prior Publication Data
US 2009/0307439 A1 Dec. 10, 2009

Related U.S. Application Data

(60) Provisional application No. 61/059,492, filed on Jun. 6, 2008.

(51) Int. Cl.
*G06F 12/00* (2006.01)
*G06F 13/00* (2006.01)
*G06F 13/28* (2006.01)

(52) U.S. Cl. .......................... 711/153; 718/104; 718/105
(58) Field of Classification Search .................. 711/153; 718/104, 105
See application file for complete search history.

(56) References Cited

U.S. PATENT DOCUMENTS

| | | | |
|---|---|---|---|
| 5,909,540 A | 6/1999 | Carter et al. | |
| RE36,462 E | 12/1999 | Chang et al. | |
| 6,725,284 B2 | 4/2004 | Arndt | |
| 6,769,017 B1 * | 7/2004 | Bhat et al. | 709/214 |
| 6,976,137 B2 | 12/2005 | Ouren et al. | |
| 7,080,146 B2 | 7/2006 | Bradford et al. | |
| 7,234,139 B1 | 6/2007 | Feinberg | |
| 7,305,592 B2 | 12/2007 | Neiger et al. | |
| 7,337,296 B2 | 2/2008 | Noel et al. | |
| 7,506,095 B2 | 3/2009 | Otte et al. | |
| 7,680,754 B2 | 3/2010 | Hillier | |
| 7,698,531 B2 | 4/2010 | Flemming et al. | |
| 7,702,843 B1 | 4/2010 | Chen et al. | |
| 7,849,347 B2 | 12/2010 | Armstrong et al. | |

(Continued)

OTHER PUBLICATIONS

Jacob Faber Kloster et al. "Efficient Memory Sharing in the Xen Virtual Machine Monitor." Jan. 2006. Department of Computer Science, Aalborg University.

(Continued)

*Primary Examiner* — Stephen Elmore
*Assistant Examiner* — Mark Giardino, Jr.
(74) *Attorney, Agent, or Firm* — Heslin Rothenberg Farley & Mesiti, P.C.

(57) ABSTRACT

Dynamic control of memory affinity is provided for a shared memory logical partition within a shared memory partition data processing system having a plurality of nodes. The memory affinity control approach includes: determining one or more home node assignments for the shared memory logical partition, with each assigned home node being one node of the plurality of nodes of the system; determining a desired physical page level per node for the shared memory logical partition; and allowing the shared memory partition to run and using the home node assignment(s) and its desired physical page level(s) in the dispatching of tasks to physical processors in the nodes and in hypervisor page memory management to dynamically control memory affinity of the shared memory logical partition in the data processing system.

18 Claims, 15 Drawing Sheets

U.S. PATENT DOCUMENTS

| | | |
|---|---|---|
| 2002/0010844 A1 | 1/2002 | Noel et al. |
| 2002/0016812 A1 | 2/2002 | Uchishiba et al. |
| 2002/0087611 A1* | 7/2002 | Tanaka et al. ............... 709/1 |
| 2002/0138704 A1 | 9/2002 | Hiser et al. |
| 2003/0084372 A1 | 5/2003 | Mock et al. |
| 2004/0139287 A1* | 7/2004 | Foster et al. ............. 711/153 |
| 2004/0193861 A1 | 9/2004 | Michaelis |
| 2004/0199599 A1 | 10/2004 | Nichols et al. |
| 2005/0071446 A1 | 3/2005 | Graham et al. |
| 2005/0132249 A1 | 6/2005 | Burton et al. |
| 2005/0160151 A1 | 7/2005 | Rawson, III |
| 2005/0240932 A1 | 10/2005 | Billau et al. |
| 2005/0278719 A1 | 12/2005 | Togawa |
| 2006/0075207 A1 | 4/2006 | Togawa et al. |
| 2006/0101224 A1* | 5/2006 | Shah et al. ............... 711/173 |
| 2006/0123217 A1 | 6/2006 | Burdick et al. |
| 2006/0146057 A1 | 7/2006 | Blythe |
| 2006/0195673 A1 | 8/2006 | Arndt et al. |
| 2006/0236059 A1 | 10/2006 | Fleming et al. |
| 2007/0061441 A1 | 3/2007 | Landis et al. |
| 2007/0112999 A1 | 5/2007 | Oney et al. |
| 2007/0168635 A1 | 7/2007 | Allen et al. |
| 2007/0210650 A1 | 9/2007 | Togashi |
| 2007/0299990 A1 | 12/2007 | Ben-Yehuda et al. |
| 2008/0040565 A1 | 2/2008 | Rozas et al. |
| 2008/0082696 A1 | 4/2008 | Bestler |
| 2008/0082975 A1 | 4/2008 | Oney et al. |
| 2008/0183996 A1 | 7/2008 | Field et al. |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2009/0100237 A1 | 4/2009 | Orikasa et al. |
| 2009/0307436 A1 | 12/2009 | Larson et al. |
| 2009/0307438 A1 | 12/2009 | Logan et al. |
| 2009/0307440 A1 | 12/2009 | Jacobs et al. |
| 2009/0307441 A1 | 12/2009 | Hepkin et al. |
| 2009/0307445 A1 | 12/2009 | Jacobs et al. |
| 2009/0307447 A1 | 12/2009 | Jacobs et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |
| 2010/0079302 A1 | 4/2010 | Eide et al. |
| 2010/0083252 A1 | 4/2010 | Eide et al. |

OTHER PUBLICATIONS

Carl A. Waldspurger. "Memory Resource Management in VMware ESX Server." Dec. 2002. ACM. OSDI '02.

IBM International Technical Support Organization, "HiperSockets Implementation Guide", pp. 1-132 (Mar. 2007).

Valdez, E. et al., "Retrofitting the IBM POWER Hypervisor to Support Mandatory Access Control", 23rd Annual Computer Security Applications Conference (pp. 221-230) (2007).

Jacobs et al., Office Action for U.S. Appl. No. 12/403,459, filed Mar. 13, 2009 (US Patent Publication No. 2009/0307445 A1), dated Mar. 7, 2012.

Logan et al., Office Action for U.S. Appl. No. 13/369,575, filed Feb. 9, 2012, dated Mar. 12, 2012.

Jacobs et al., Office Action for U.S. Appl. No. 13/344,721, filed Jan. 6, 2012, dated Mar. 20, 2012.

Jacobs et al., Office Action for U.S. Appl. No. 13/344,708, filed Jan. 6, 2012, dated Mar. 27, 2012.

Logan et al., Office Action for U.S. Appl. No. 12/403,416, filed Mar. 13, 2009 (US Patent Publication No. 2009/0307690 A1), dated Mar. 30, 2012.

Larson et al., Office Action for U.S. Appl. No. 13/362,402, filed Jan. 31, 2012, dated Apr. 11, 2012.

Hernandez et al., Office Action for U.S. Appl. No. 12/478,990, filed Jun. 5, 2009 (U.S. Letters Patent No. 8046,641), dated Jan. 1, 2011.

Logan et al., Notice of Allowance for U.S. Appl. No. 12/403,426, filed Mar. 19, 2009 (U.S. Patent No. 8,135,921), dated Nov. 7, 2011.

Jacobs et al., Office Action for U.S. Appl. No. 12/403,485, filed Mar. 19, 2009 (U.S. Patent No. 8,171,236), dated Oct. 7, 2011.

Anderson et al., Office Action for U.S. Appl. No. 12/403,402, filed Mar. 13, 2009 (U.S. Patent no. 8,230,077), dated Nov. 30, 2011.

Jacobs et al., Notice of Allowance for U.S. Appl. No. 12/403,447, filed Mar. 13, 2009 (U.S. Patent No. 8,127,086), dated Oct. 18, 2011.

Larson et al., Notice of Allowance for U.S. Appl. No. 12/403,408, filed Mar. 13, 2009 (U.S. Patent No. 8,166,254), dated Dec. 19, 2011.

Logan et al., Office Action dated Jul. 16, 2012, for U.S. Appl. No. 13/447,393, filed Apr. 16, 2012.

* cited by examiner

| LOGICAL PARTITION ID | PROCESSORS | MEMORY (GB) |
|---|---|---|
| 1 | 8 | 8 |
| 2 | 4 | 4 |
| 3 | 2 | 2 |
| 4 | 2 | 2 |

DYNAMIC CONTROL OF PARTITION MEMORY AFFINITY IN A SHARED MEMORY PARTITION DATA PROCESSING SYSTEM

CROSS-REFERENCE TO RELATED APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to dynamic control or adjustment of memory affinity of logical partitions within a shared memory partition data processing system comprising a plurality of shared memory logical partitions running on a plurality of nodes.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This off-loading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of physical memory in one or more servers that is shared by other shared memory partitions on those servers. The amount of physical memory in the pool is typically smaller than the sum of the logical memory assigned to all of the shared memory partitions in the pool to allow the memory to be more fully utilized. Idle and/or less active logical memory in the shared partitions that does not fit in the physical memory pool is paged out by the hypervisor to a cheaper and more abundant form of storage (i.e., the paging devices) via an entity external to the hypervisor known as a paging service partition. In one implementation, the paging device(s) are defined in one or more physical storage disks. Disclosed herein are processes for dynamically adjusting memory affinity of shared memory logical partitions in a shared memory partition data processing system comprising a plurality of shared memory logical partitions assigned to a plurality of nodes (or servers).

Provided herein, in one aspect, is a computer-implemented method of dynamically controlling memory affinity of a shared memory logical partition. The method includes: determining at least one home node assignment for a shared memory logical partition in a shared memory data processing system, the shared memory logical partition running on a plurality of nodes of the shared memory partition data processing system, with each assigned home node being one node of the plurality of nodes; determining a desired physical page level per node for the shared memory logical partition; and allowing the shared memory partition to run and using the at least one home node assignment and its desired physical page levels for the plurality of nodes in the dispatching of tasks to physical processors in the plurality of nodes and in hypervisor page memory management to dynamically control memory affinity of the shared memory logical partition in the shared memory partition data processing system.

In a further aspect, a computing environment is provided which includes a shared memory partition data processing system comprising a plurality of physical processors and associated memory disposed in a plurality of nodes. The shared memory partition data processing system further includes a plurality of shared memory logical partitions running on the plurality of nodes, as well as logic for: determining at least one home node assignment for a shared memory logical partition of the plurality of shared memory logical partitions, wherein each assigned home node is one node of a plurality of nodes; determining a desired physical page level per node for the shared memory logical partition; and allowing the shared memory logical partition to run and using the at least one home node assignment and its desired physical page levels for the plurality of nodes in the dispatching of tasks to physical processors in the plurality of nodes and in hypervisor page memory management to dynamically control memory affinity of the shared memory logical partition in the shared memory partition data processing system.

In a further aspect, an article of manufacture is provided, which includes at least one computer-readable medium having computer-readable program code logic to dynamically control memory affinity of a shared memory logical partition. The computer-readable program code logic when executing on a processor performing: determining at least one home node assignment for the shared memory logical partition in a shared memory partition data processing system, the shared memory logical partition running on a plurality of nodes of the shared memory partition data processing system, with each assigned home node being one node of the plurality of nodes; determining a desired physical page level per node for the shared memory logical partition; and allowing the shared memory partition to run and using the at least one home node assignment and its desired physical page levels for the plurality of nodes in the dispatching of tasks to physical processors in the plurality of nodes and in hypervisor page memory management to dynamically control memory affinity of the shared memory logical partition in the shared memory partition data processing system.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 13A & 3B depict one embodiment of logic for distributing desired memory pages of each shared memory partition, principally to the shared memory partition's assigned home node(s), in accordance with an aspect of the present invention.

DETAILED DESCRIPTION OF THE INVENTION

Figure 1:
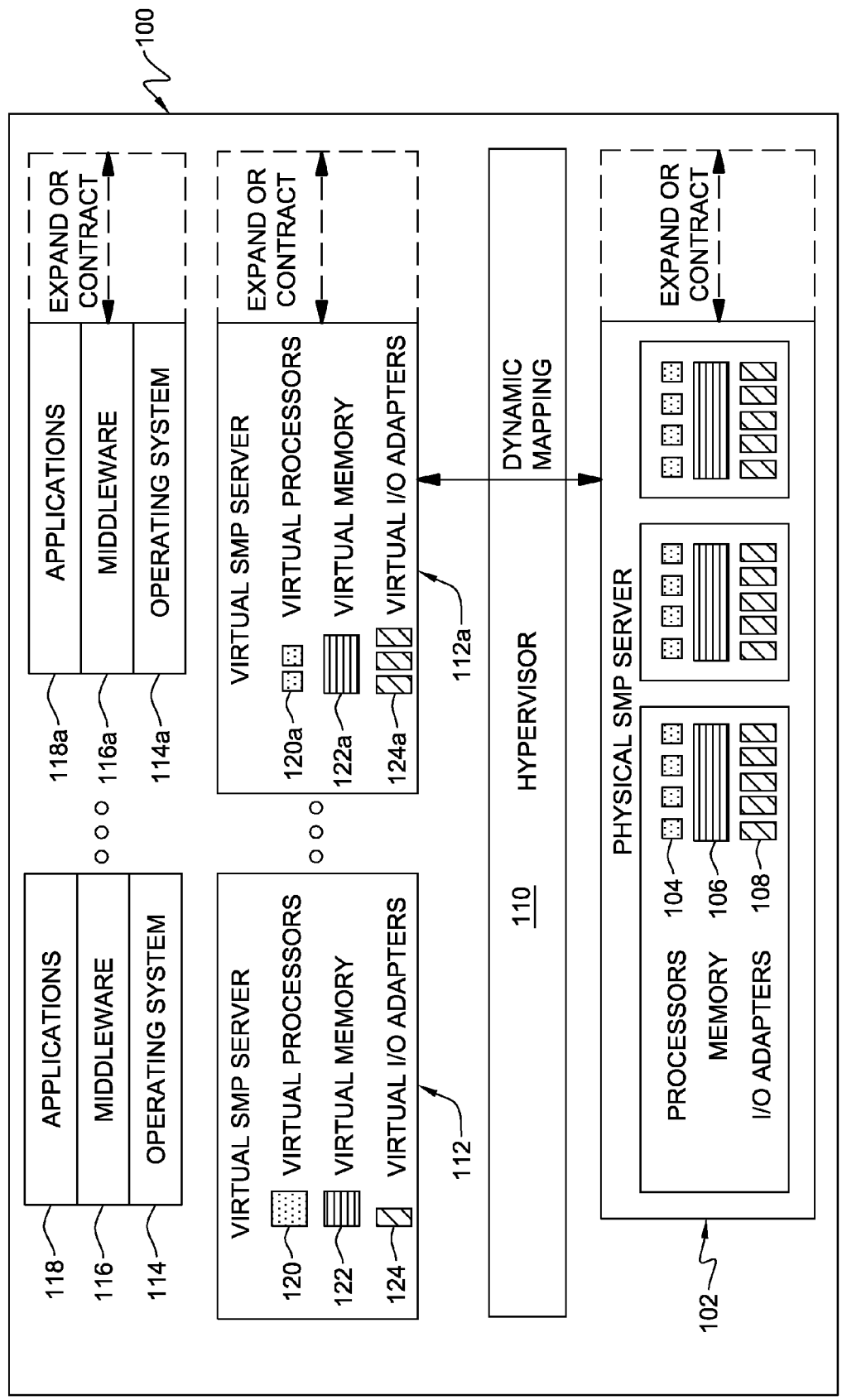
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
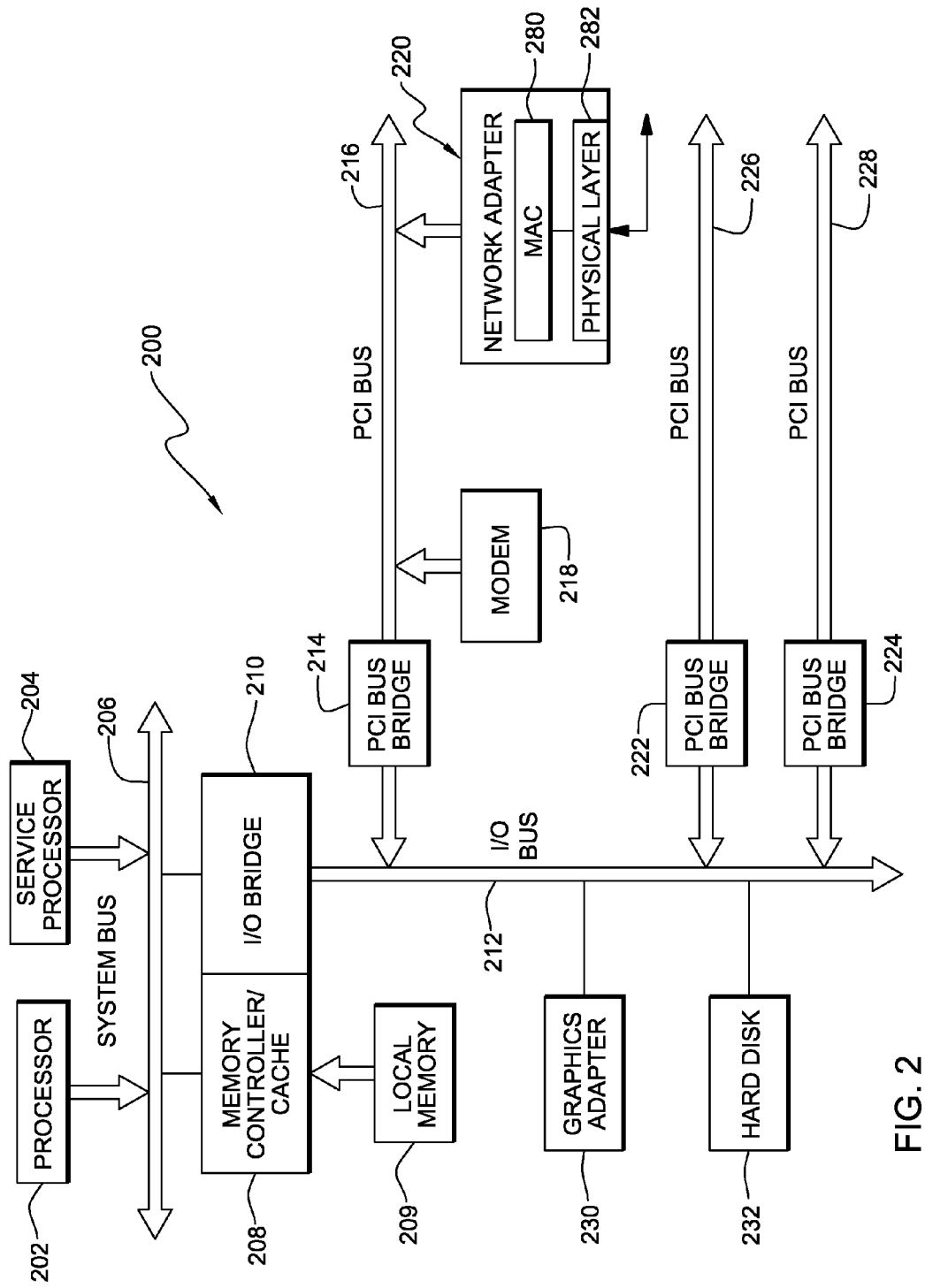
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR), Version 2.7, Oct. 9, 2007, material, available from International Business Machines Corporation, Armonk, N.Y., U.S.A., which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
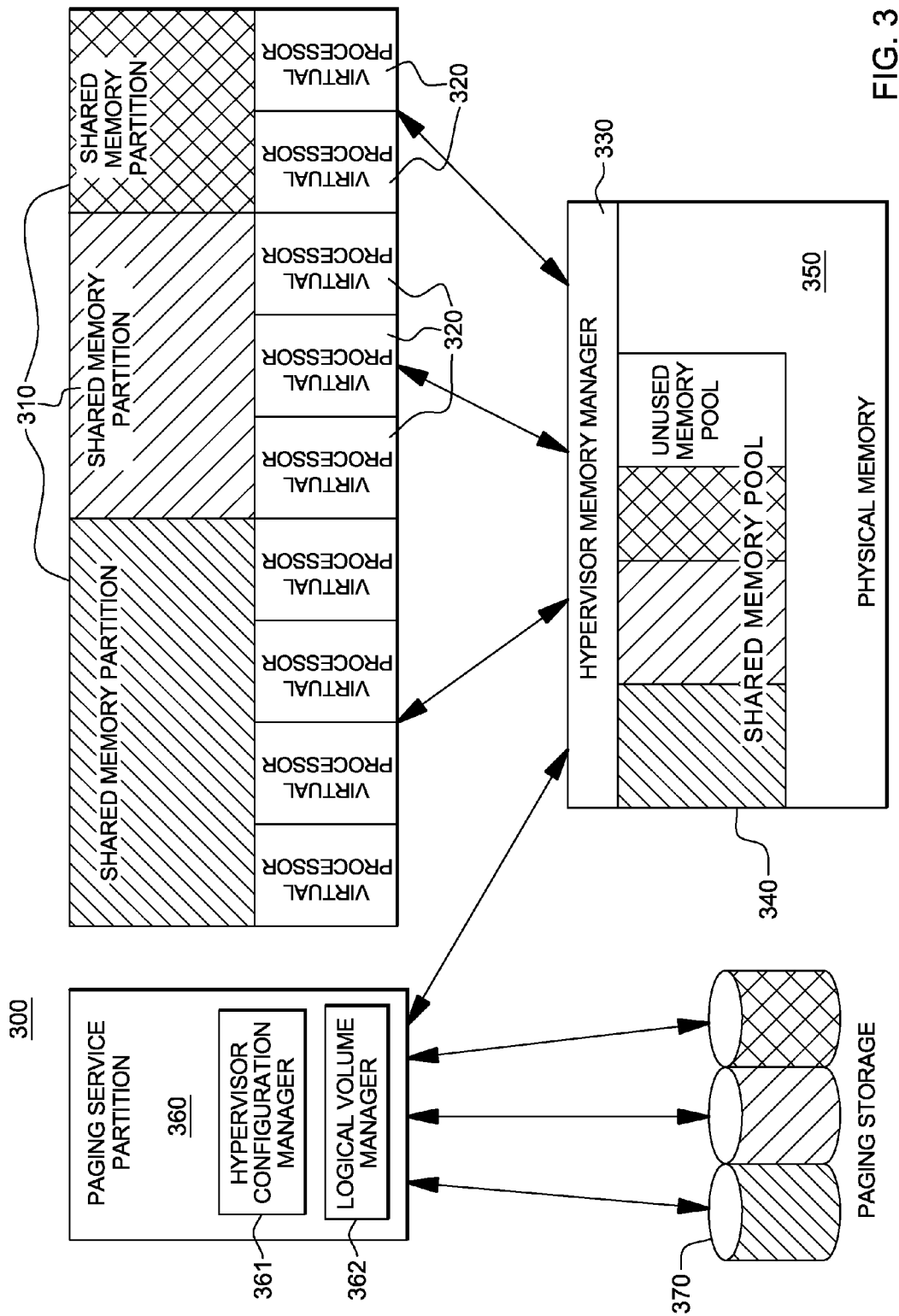
FIG. 3 illustrates one embodiment of a data processing system comprising multiple shared memory logical partitions (or shared memory partitions) employing a shared (or common) memory pool within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, the shared memory partition data processing system 300 includes one or more shared memory partitions 310, each of which comprises one or more virtual processors 320, which interface through a hypervisor, and more particularly, a hypervisory memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged out by the hypervisor to a more abundant, less expensive storage (such as disk storage), via a paging service partition 360. Paging service partition 360 is an enhanced virtual input/output service (VIOS) partition configured to facilitate paging-out and paging-in of memory pages from or to, respectively, the shared memory pool.

Although referred to as a shared memory pool, in reality, there is no sharing of memory per se, but rather a sharing of the availability of a defined amount of physical memory in the pool. This shared memory pool is alternatively characterized as active memory, or virtual real memory. The amount (or volume) of memory within shared memory pool may be dynamically allocated or adjusted between the shared memory partitions into sub-volumes or sets of physical pages to accommodate workloads. These dynamically allocated or adjusted sub-volumes or sets of physical pages from the shared memory pool are associated with the multiple logical partitions, and may comprise contiguous or disparate physical memory locations within the shared memory pool. A physical memory page of the shared memory pool becomes part of a sub-volume of a particular logical partition when a logical memory page thereof is associated with or mapped to that physical page. Again, there is no concurrent sharing of access to a physical page per se, but rather a sharing of the defined amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output (VIO) adapter connections to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by a shared memory partition and it does not have a physical mapping in the shared memory pool, the hypervisor treats this request to access as an internal fault (i.e., hypervisor page fault). In response to a hypervisor page fault for a logical memory page that is not resident in the shared memory pool, an input/output (I/O) paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of that processor until the I/O paging request is satisfied, or if the hypervisor page fault occurred while external interrupts were enabled for the virtual processor, until an external or timer interrupt occurs. The I/O paging request is submitted to the VIO adapter of the paging service partition, which communicates with the paging service partition in order to retrieve and return the correct logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 4:
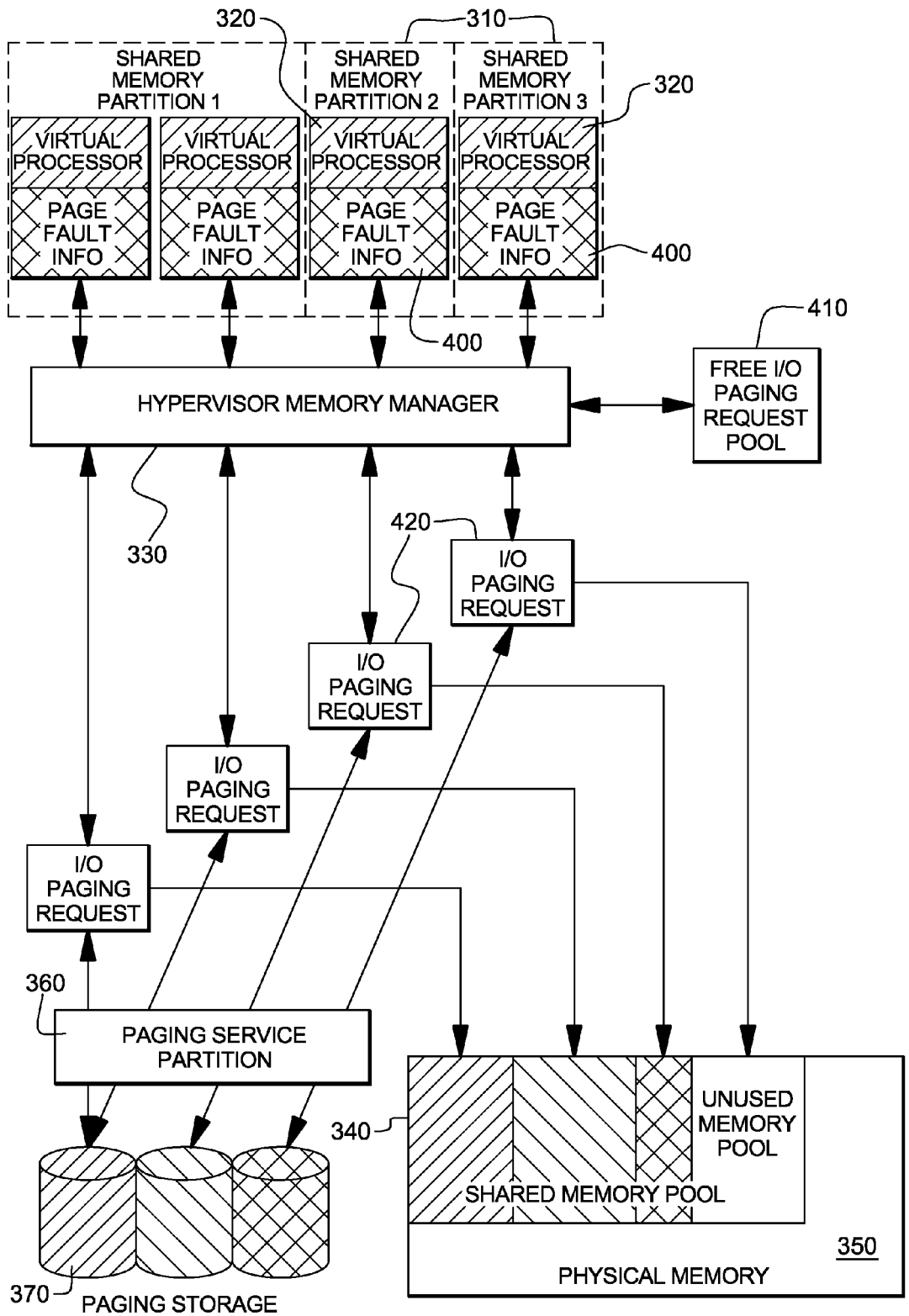
FIG. 4 illustrates one embodiment of an approach for handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 takes an I/O paging request 420 from a free I/O paging request pool 410 and sends, via the paging service partition 360, the I/O paging request to the external storage entity 370 to request the needed page. Concurrent with requesting the needed page, the partition's virtual processor encountering the hypervisor page fault is placed into a wait state.

As noted initially, provided herein are methods, systems and articles of manufacture for facilitating dynamic control or adjustment of memory affinity of logical partitions within a shared memory partition data processing system such as described above. In the discussion below, the shared memory partition data processing system is assumed to comprise a plurality of shared memory logical partitions running on a plurality of nodes of the system. Prior to disclosing protocol for dynamically adjusting or controlling memory affinity of shared memory logical partitions within such a data processing system, however, the concept of memory affinity is first described below with reference to the non-shared memory partition system of FIGS. 5-9.

As is well known, the combination of hardware and software on a particular computing system defines a computing environment. Different hardware platforms and different operating systems provide different computing environments. In recent years, engineers have recognized that it is possible to provide different computing environments on the same physical computer system by logically partitioning the computer system resources to different computing environments. The "series" of computer system developed by IBM is an example of a computer system that supports logical partitioning. If logical partitioning on a "series" computer system is desired, partition manager code (i.e., the "hypervisor") is installed that allows different computing environments to be defined on the same platform. Once the partition manager is installed, logical partitions may be created that define the different computing environments. The partition manager manages the logical partitions to assure that they can share needed resources in the computer system while maintaining the separate computing environments defined by the logical partitions.

More recent developments in the filed of logical partitioning support dynamic allocation of resources as logical partitions are running, and support defining logical partitions across multiple nodes in a computer system. The ability to dynamically allocate resources as logical partitions are running gives rise to issues relating to memory affinity in a logical partition. Memory affinity for a logical partition can be measured as the ratio of the logical partition's memory per node to the logical partition's processors per node. Memory affinity is important when logical partitions may span across nodes because an access by a processor in a logical partition in one node is much faster to memory on the same node than to memory on a different node. For this reason, it is desirable to provide each processor on a node with corresponding memory. If this is possible, good memory affinity may be achieved.

When logical partitions are first started, the partition manager typically creates the logical partitions with perfect memory affinity, meaning that each processor has a corresponding amount of memory on each node, or with similar memory affinity for all logical partitions if perfect memory affinity cannot be achieved. Note, however, that dynamic reallocation of resources may negatively impact the memory affinity of one or more logical partitions. As time goes on, it is possible for the memory affinity of a logical partition to degrade to the point of being a significant negative impact on performance of the logical partition. Without a way to dynamically adjust resource allocation to improve memory affinity in a logical partition, degradation in memory affinity due to dynamic allocation of resources may result in a logical partition that does not have the desired performance.

Figure 5:
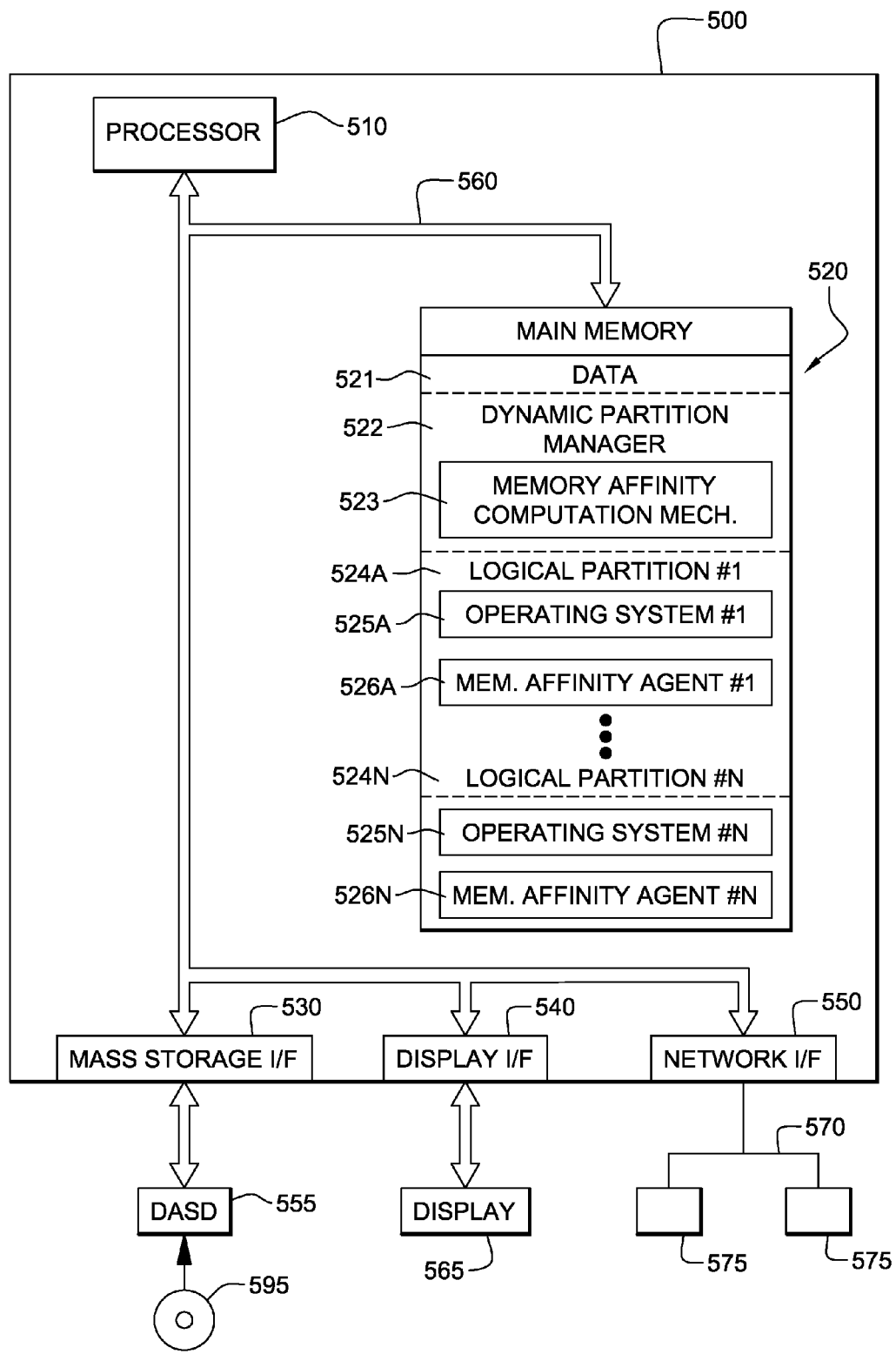
FIG. 5 is a block diagram of a further embodiment of a data processing system to implement one or more aspects of the present invention.

Referring to FIG. 5, a computer system 500 is shown as one suitable implementation of a system in accordance with one aspect of the present invention. Computer system 500 is, in one embodiment, an IBM eServer® series computer system. However, those skilled in the art will note that the mechanism and apparatus of the present invention apply equally to any computer system that is capable of being logically partitioned, regardless of whether the computer system is a complicated multi-user computing apparatus, a single-user workstation, or an embedded control system. As shown in FIG. 5, computer system 500 comprises one or more processors 510, a main memory 510, a mass storage interface 530, a display interface 540, and a network interface 550. These system components are interconnected through the use of a system bus 560. Mass storage interface 530 is used to connect mass storage devices, such as a direct access storage device 555, to computer system 500. One specific type of direct access storage device 555 is a readable and writable CD-RW drive, which may store data to and read data from a CD-RW 595.

Main memory 520 of the present invention contains data 521, a dynamic partition manager 522, and multiple logical partitions 524, shown in FIG. 5 as 524A, 524N. Data 521 represents any data that serves as input to or output from any program in computer system 500. Dynamic partition manager 522 is a sophisticated program that contains low-level code to manage the resources of computer system 500. Some of these resources are processor 510, main memory 520, mass storage interface 530, display interface 540, network interface 550, and system bus 560. Dynamic partition manager 522 includes a memory affinity computation mechanism 523 that allows (in one embodiment) the dynamic partition manager 522 to compute a current memory affinity based on the current allocation of resources, and to compute a potential memory affinity based on a proposed reallocation of resources. In one embodiment, dynamic partition manager 522 creates the N logical partitions 524. Each logical partition 524 includes a corresponding operating system, shown in FIG. 5 as operating systems 525A through 525N, and a corresponding memory affinity agent, shown in FIG. 5 as memory affinity agents 526A through 526N.

The operating system in each logical partition is a multitasking operation system, such as i5/OS, AIX, or Linux operating system; however, those skilled in the art will appreciate that the spirit and scope of the present invention is not limited to any one operation system. Any suitable operating system can be used. The operating system in each logical partition may be the same as the operating system in other logical partitions, or may be a completely different operating system. Thus, one logical partition can run the i5/OS operating system, while a different logical partition can run another instance of i5/OS, possibly a different release, or one with different environmental settings (e.g., time zone or language). The operating system in each logical partition could even be different than i5/OS, provided it is compatible with the hardware (such as AIX or Linux). In this manner, the logical partitions can provide completely different computing environments on the same physical computer system.

Logical partitions 525A-525N are shown in FIG. 5 to reside within main memory 520. However, one skilled in the art will recognize that a logical partition is a logical construct that includes resources other than memory. A logical partition typically specifies a portion of memory, along with an assignment of processor capacity and other system resources. Thus, one logical partition could be defined to include two processors and a portion of memory 520. Another logical partition could then be defined to include three other processors and a different portion of memory 520. The logical partitions are shown in FIG. 5 to symbolically represent logical partitions, which would include system resources outside of memory 520 within computer system 500. Note also that the dynamic partition manager 522 resides (in one embodiment) in memory and hardware separate from the logical partitions and includes facilities and mechanism that are not directly available to the logical partitions.

In the illustrated embodiment, each logical partition includes a corresponding memory affinity agent, shown in FIG. 5 as memory affinity agents 526A, . . . 526N. The memory affinity agent in each logical partition may request the dynamic partition manager 522 use its memory affinity computation mechanism 523 to determine current memory affinity based on a current allocation of resources, and to determine potential memory affinity based on a proposed reallocation of resources. If the potential memory affinity is greater than the current memory affinity, then the logical partition may request the dynamic partition manager 522 to provide the proposed reallocation of resources. In this way, a logical partition may dynamically monitor its memory affinity, and may dynamically make adjustments in resource allocation to improve its memory affinity.

Computer system 500 utilizes well-known virtual addressing mechanisms that allow the programs of computer system 500 to behave as if they only have access to a large, single storage entity instead of access to multiple, smaller storage entities such as main memory 520 and DASD device 555. Therefore, while data 521, dynamic partition manager 522, and logical partitions 524A, . . . , 524N are shown to reside in main memory 520, those skilled in the art will recognize that these items are not necessarily all completely contain in main memory 520 at the same time. It should also be noted that, in one aspect, the term "memory" (without further qualification) is used herein generically to refer to the entire virtual memory of computer system 500, and may include the virtual memory of other computer systems coupled to computer system 500.

Processor 510 may be constructed from one or more microprocessors and/or integrated circuits. Processor 510 executes program instructions stored in main memory 520. Main memory 520 stores programs and data that processor 520 may access. When computer system 500 starts up, processor 520 initially executes the program instructions that make up dynamic partition manager 522.

Although computer system 500 is shown to contain only a single processor and a single system bus, those skilled in the art will appreciate that the present invention may be practiced using a computer system that has multiple processors and/or multiple buses. In addition, the interfaces that are used in the present invention each include separate, fully-programmed microprocessors that are used to off-load compute-intensive processing from processor 510. However, those skilled in the art will appreciate that the present invention applies equally to computer systems that simply use input/output (I/O) adapters to performs similar functions.

Display interface 540 is used to directly connect one or more displays 565 to computer system 500. These displays 565, which may be non-intelligent (i.e., dumb) terminals or fully-programmable workstations, are used to allow system administrators and users to communicate with computer system 500. Note, however, that while display interface 540 is provided to support communication with one or more displays 565, computer system 500 does not necessarily require a display 565, because all needed interaction with users and other processes may occur via network interface 550.

Network interface 550 is used to connect other computer system and/or workstations (e.g., 575 in FIG. 5) to computer system 500 across a network 570. The present invention applies equally no matter how computer system 500 may be connected to other computer systems and/or workstations, regardless of how the network connection 570 is made. In addition, many different network protocols can be used to implement the network. These protocols are specialized computer programs that allow computers to communicate across network 570. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the invention applies equally regardless of the particular type of computer-readable signal bearing media used to actually carry out the distribution. Examples of suitable computer-readable signal bearing media include: recordable type media such as floppy disks and CD RW (e.g., 595 of FIG. 5), and transmission type media such as digital and analog communications links. Note that the preferred signal bearing media is tangible.

Figures 6, 7:
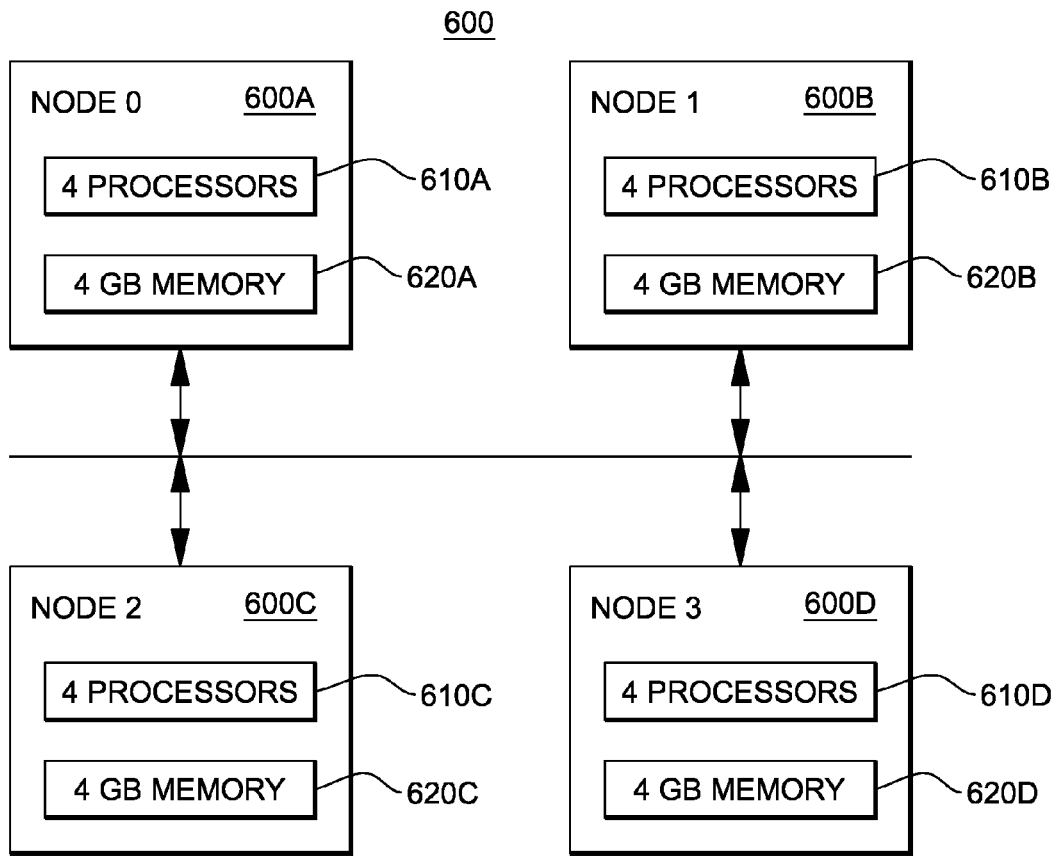
FIG. 6 is a block diagram of a sample computer system before logical partitioning.
FIG. 7 is a table showing a sample allocation of the resources shown in FIG. 6 to four different logical partitions.

Referring to FIG. 6, a sample computer system 600 is shown that includes four nodes 600A, 600B, 600C and 600D. Each node includes four processors and four gigabytes of memory. Thus, node 600A includes four processors 610A and four GB of memory 620A; node 600B includes four processors 610B and four GB of memory 620B; node 600C includes four processors 610C and four GB of memory 620C; and node 600D includes four processors 610D and four GB of memory 620D.

We now assume that the hardware shown in FIG. 6 needs to be allocated to logical partitions according to the table in FIG. 7. Logical partition 1 (LP1) is defined to include eight processors and eight GB memory; LP2 is defined to include four processors and four GB memory; LP3 is defined to include two processors and two GB memory; and LP4 is defined to include two processors and two GB memory.

Figure 8:
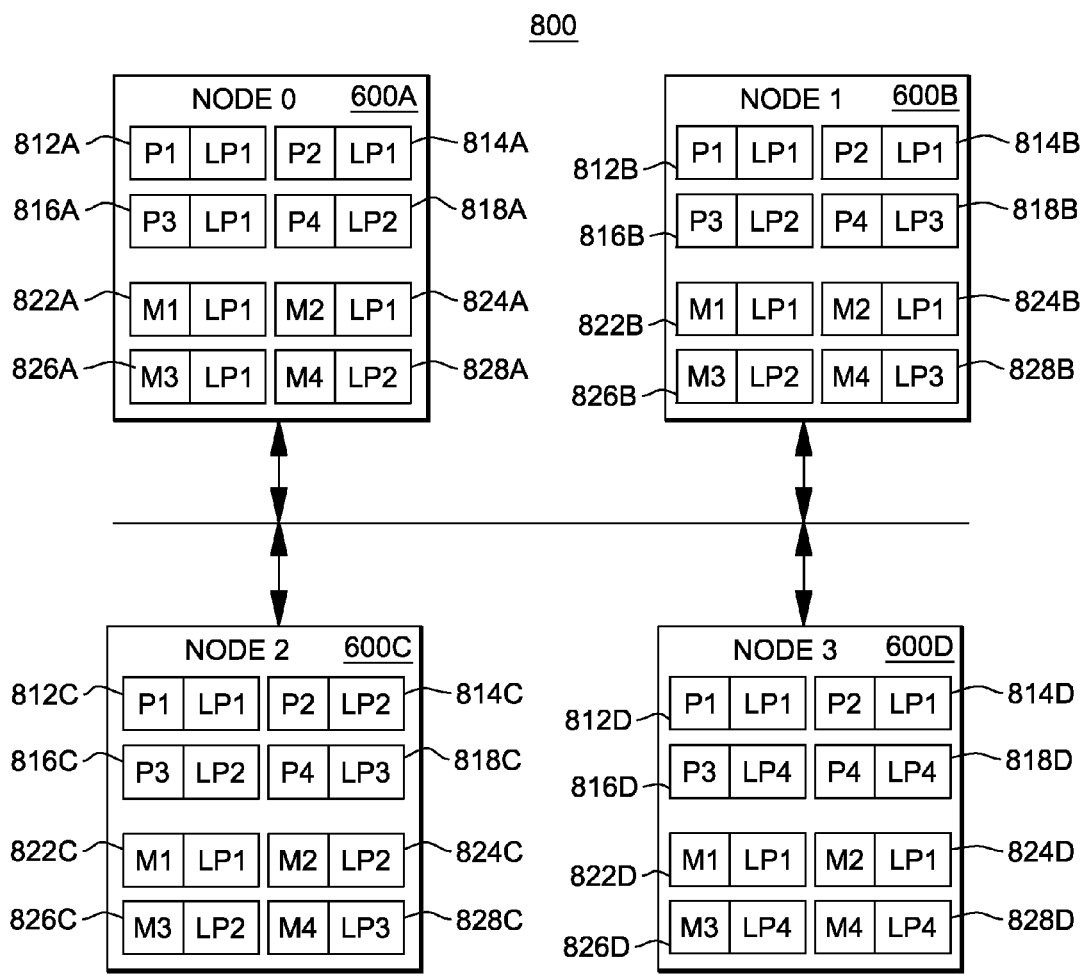
FIG. 8 is a block diagram showing one suitable sample configuration of the computer system of FIG. 6, after logical partitioning as shown in FIG. 7, in accordance with an aspect of the present invention.
Figure 9:
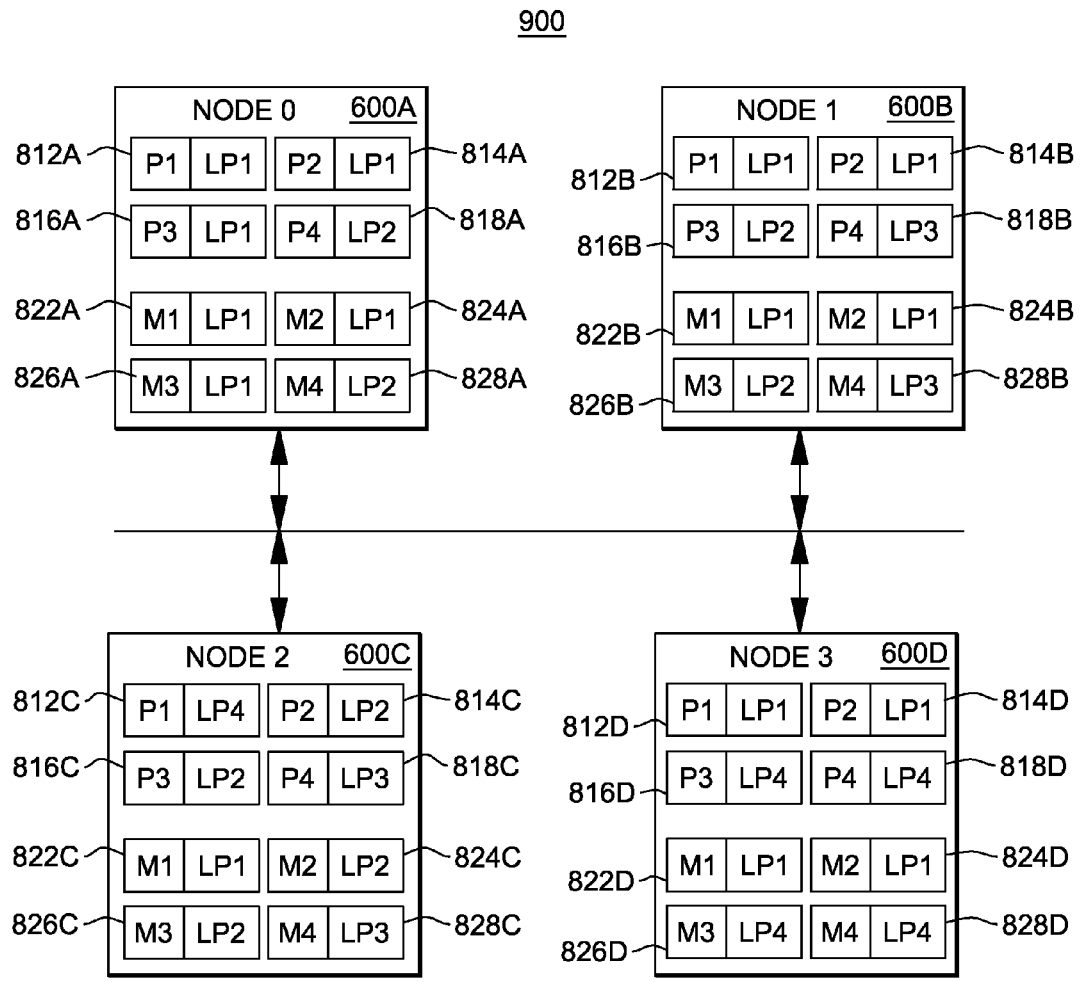
FIG. 9 is a block diagram showing the computer system of FIG. 8 after reallocation of resources that results in less than perfect memory affinity for two of the logical partitions, which is to be addressed in accordance with one or more aspects of the present invention.

We assume that one of the nodes in FIG. 6 includes the dynamic partition manager 522 shown in FIG. 5, which initializes the logical partitions when the computer system 600 is first powered up. We assume for the purpose of this example that the dynamic partition manager in one of the nodes configures the logical partitions as shown in computer system 800 in FIG. 8. Note that the four processors in each node are assigned to one of the logical partitions, and the 4 GB of memory in each node is also divided up and allocated to the logical partitions. Note that memory is typically allocated to a logical partition in a block referred to herein as a logical memory block. Priori art partition managers allow the system administrator to specify the size of each logical memory block to be a size of 256 MB, which means it takes four logical memory blocks to equal a gigabyte of memory. The memory chunks shown in FIG. 8 are one gigabyte blocks for the sake of convenience in the figures, which means each memory block in FIG. 8 includes four logical memory blocks. These memory block sizes are provided by way of example only.

Referring again to FIG. 8, three of the four processors on node 600A, namely processors 812A, 814A and 816A are allocated to LP1. In similar fashion, memory blocks 822A, 824A and 826A are allocated to LP1. The fourth processor 818A is allocated to LP2, as is the fourth memory block 828A. On node 600B, two of the processors, namely processors 812B and 814B, are allocated to LP1; one of the processors 816B is allocated to LP2; and one of the processors 818B is allocated to LP3. In similar fashion, memory blocks 822B and 824B are allocated to LP1; memory block 826B is allocated to LP2; and memory block 828B is allocated to LP3.

On node 600C, one processor 812C is allocated to LP1; two processors 814C and 816C are allocated to LP2; and one processor 818C is allocated to LP3. In similar fashion, memory block 822C is allocated to LP1; memory blocks 824C and 826B are allocated to LP2; and memory block 828C is allocated to LP3. On node 600D, two processors 812D and 814D are allocated to LP4. In similar fashion, memory blocks 822D and 824D are allocated to LP1; and memory blocks 826D and 828D are allocated to LP4.

Because memory affinity of a logical partition can be measured as the ratio of the logical partition's memory per node to the logical partition's processors per node, we see from the allocation shown in FIG. 8 that each logical partition has perfect (i.e., 100%) memory affinity, because for each processor on each node for any logical partition, there is a corresponding 1 GB block of memory on that same node. Note that the configuration of computer system 800 shown in FIG. 8 is assumed to be the state of the processor and memory allocations at a partition point in time, such as just after initial program load (IPL).

Because computer system 800 includes a dynamic partition manager 522, as shown in FIG. 5 on one of the nodes, it is possible for the allocation of memory and processors in computer system 800 to change over time, thereby negatively impacting memory affinity for one or more of the logical partitions. This is the case with the configuration of computer system 900 shown in FIG. 9, which shows that processor 812C in node 600C has been reallocated to LP4 instead of LP1. None of the other processor or memory allocations in FIG. 5 change, and are the same as shown in FIG. 8. As a result, there is a mismatch between processors and memory in LP1 and LP4, causing a reduction in the memory affinity in LP1 and LP4 due to the reallocation shown in FIG. 9.

In one approach, the dynamic partition manager 522 includes a memory affinity computation mechanism 523 that computers memory affinity for a logical partition using the following equation:

$$\text{memory affinity} = \left(100 - \sum_{1}^{n} |PMn - PCn|\right) + PRn$$

where n=the number of nodes used by the selected logical partition.

PMn=the percent of the selected logical partition's memory on the node.

PCn=the percent of the selected logical partition's processors on the node.

PRn=the percent of the selected logical partition's total resources on the node, which equals (PMn+Pcn)/2.

This equation is used to return a number between 0 and 100 that indicates the percentage, or score, of memory affinity for a logical partition. As noted, in one embodiment, the current memory affinity may be compared with a potential memory affinity at the request of a logical partition to help the logical partition determine whether a reallocation of resources between nodes may improve memory affinity for the logical partition. If so, the logical partition requests reallocation of resources by the dynamic partition manager so memory affinity for the logical partition is improved. Further details on this approach are provided in commonly assigned, co-pending U.S. Ser. No. 11/335,812, filed Jan. 19, 2006, published on Jul. 19, 2007 as U.S. Patent Publication No. US 2007/0168635 A1, the entirety of which is hereby incorporated herein by reference.

The above-described concept of dynamically controlling or adjusting memory affinity of a logical partition is extended herein to the environment of a shared memory partition data processing system, such as described above in connection with FIGS. 1-4. As noted above in connection with FIGS. 5-9, memory and processors on certain computing platforms are constructed in a fashion where certain physical memory can be accessed more quickly by some physical processors than by other physical processors. Similarly, a given processor can access certain physical memory more quickly than other memory. The access proximity of a given unit of memory (referred to herein as a node) to a processor is the memory affinity between that processor and the node. Ideally, the computing platform's hypervisor matches up the processors and memory utilization by a partition in a manner such that the memory accessed by each processor is within a node that has the best possible affinity for that processor. In reality, a best case affinity scenario is usually impossible to achieve, because: a partition may require processor units on multiple physical processors, or memory that is spread across multiple nodes; limitations on the hypervisor's knowledge of which nodes each of the partition's processor units will access and the frequency of those accesses; and conflicting demands for resources from other partitions.

FIGS. 10A-13B depict one embodiment of logic for monitoring and dynamically controlling partition memory affinity in a shared memory partition data processing system.

Figure 10A:
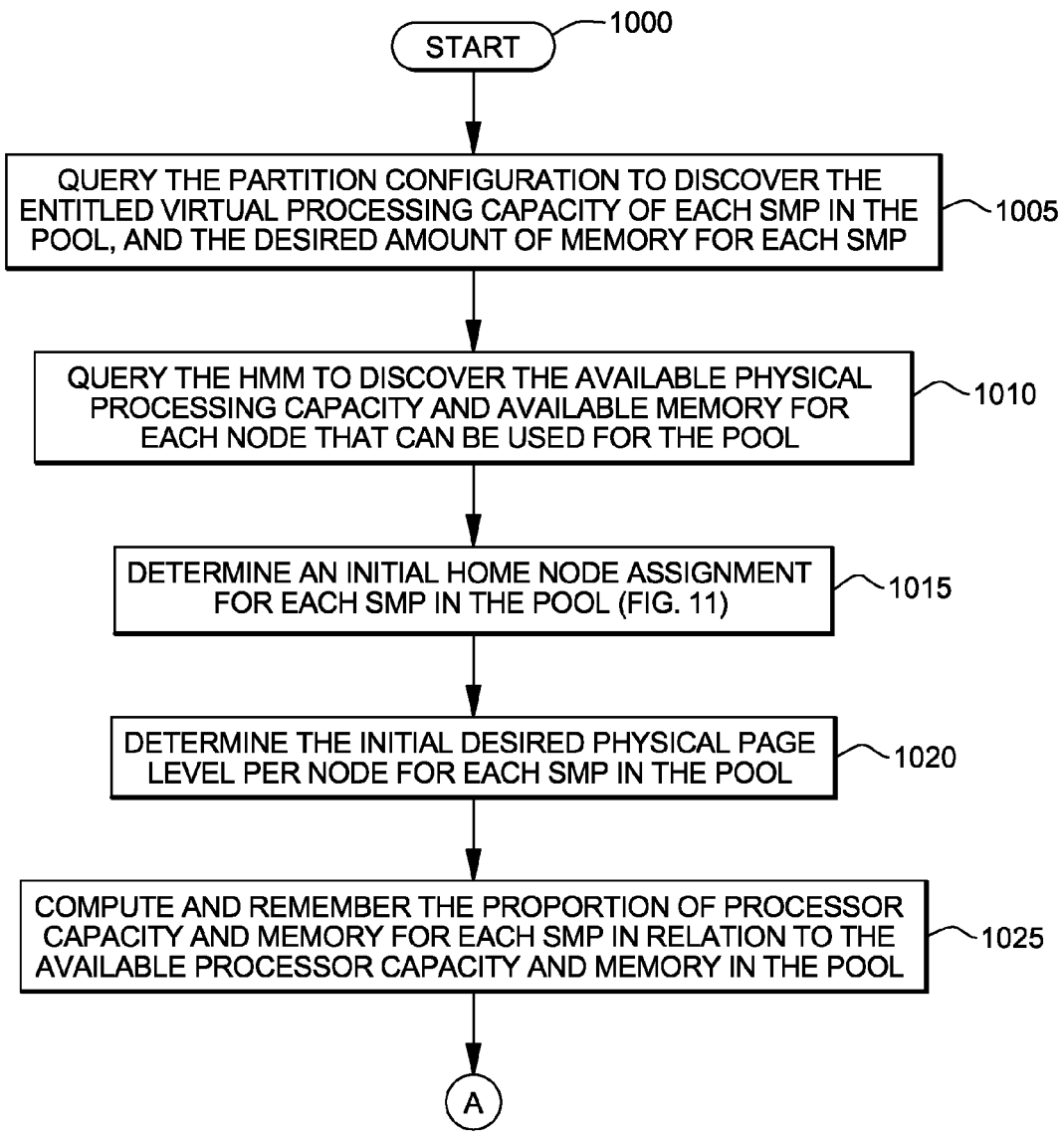
FIGS. 10A & 10B are a flowchart of one embodiment of logic for dynamically controlling or adjusting memory affinity of shared memory logical partitions in a shared memory partition data processing system, in accordance with an aspect of the present invention.
Figure 10B:
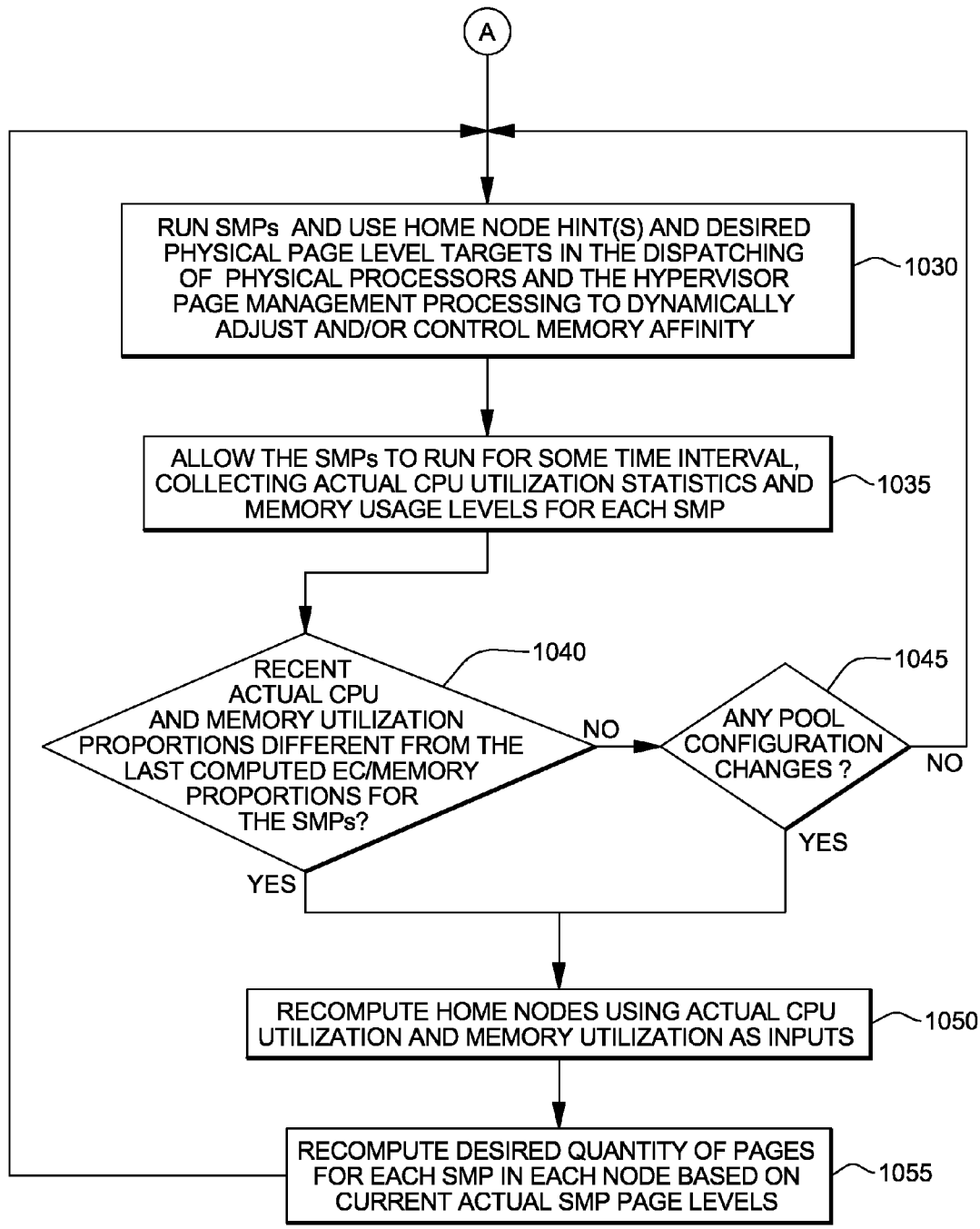

Referring to FIGS. 10A & 10B, one embodiment of logic for monitoring shared memory partitions of a shared memory partition data processing system and controlling memory affinity thereof is depicted. This logic is implemented, in one embodiment, within a hypervisor or hypervisor memory manager (described above), of the shared memory partition data processing system. Memory affinity monitoring and control starts 1000 with the hypervisor or hypervisor memory manager (HMM) querying the partition configuration to discover the entitled virtual processing capacity of each shared memory logical partition (SMP) in a pool of shared memory logical partitions of the data processing system, as well as the desired amount of memory for each shared memory partition 1005. The user may initially define the entitled virtual processing capacity for each SMP and the desired amount of memory for that SMP. The hypervisor memory manager is queried to discover the available physical processing capacity and available memory for each node that can be used for the pool of shared memory partitions of the system 1010. This step maps what resources are available and how they are divided between the nodes. Essentially, how many physical processors and how much physical memory are available in each node are determined.

Figure 11:
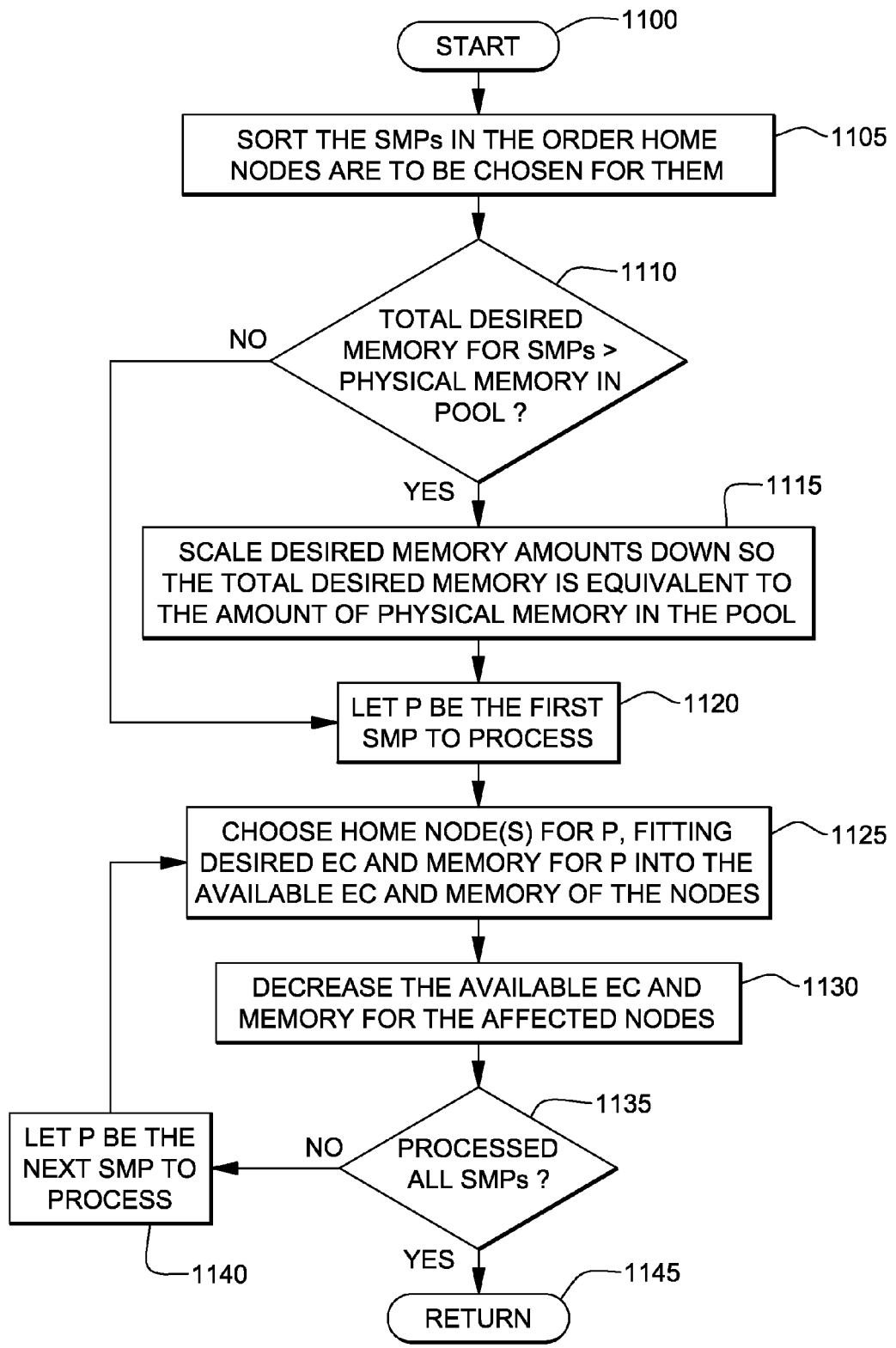
FIG. 11 depicts one embodiment of logic for assigning one or more home nodes to each shared memory partition in a pool of shared memory partitions of a shared memory partition data processing system, in accordance with an aspect of the present invention.

Next, the logic determines an initial home node assignment for each shared memory partition in the pool 1015. One embodiment for assigning home nodes for each shared memory partition is depicted in FIG. 11, and described further below. As used herein, a shared memory partition may have one or more home nodes assigned to it, with each home node assignment being a hint to the hypervisor about where to devote resources for the particular shared memory partition at issue. If a shared memory partition does not readily fit within a single physical node, then there may be multiple home nodes assigned to that shared memory partition. Thus, when the dispatcher is determining where to devote physical processing resources for a task of a particular shared memory partition, the dispatcher principally employs physical processors that are on the home node(s) for that partition.

Continuing with FIG. 10A, the logic determines the initial desired physical page level per node for each shared memory partition in the pool of shared memory partitions of the system 1020. This is a determination of how many physical pages at the node are to be assigned to the particular shared memory partition at issue. As noted, memory affinity is achieved by the hypervisor devoting physical page resources on the assigned home node to the shared memory partition. Memory affinity for a particular shared memory logical partition refers to the closeness (or the proximity) of the assigned physical memory to the assigned processors in terms of latency for accessing. Thus, memory affinity for a logical partition can be quantified as the ratio of a logical partition's memory per node to the logical partition's processors per node.

Next, a determination is made as to how much each shared memory partition is to use within each physical node by computing and storing the proportion of processor capacity and memory for each shared memory partition in relation to the available processor capacity and memory in the pool of available processor capacity and memory of each node 1025.

As shown in FIG. 10B, the home node hints (or assignments) and the desired physical page level targets for each shared memory partition are used in dispatching of tasks to physical processors of the nodes and in hypervisor page management processing to dynamically adjust or control memory affinity as the shared memory partitions run or execute within the data processing system 1030. The shared memory partitions are allowed to run for a time interval, which may be defined or arbitrary, while actual physical processor utilization statistics and memory utilization levels are collected for each shared memory partition 1035. The hypervisor memory manager is aware of page level usage by each shared memory partition. In particular, the hypervisor memory manager can track how many page faults may occur for a particular logical partition, and how often the logical partition requires additional memory, and thus, knows the memory usage levels for each shared memory partition (SMP).

The logic then determines whether the recent actual physical processor and memory utilization proportions for a shared memory partition are different from the previously determined entitled processor capacity (EC)/memory proportions for that shared memory partition 1040. By way of example, if there is a difference greater than a predefined percentage or threshold number, then re-computation may occur. If actual physical processor and memory utilization proportions are within defined limits of the previously determined or assigned entitled processor capacity and memory proportions for the shared memory partitions, then the logic determines whether there are any configuration changes in the pool of shared memory partitions of the data processing system 1045. If "no", then the logic continues with running of the shared memory partitions using the previously assigned home node hints and desired physical page level targets for the dispatching of the physical processors and the hypervisor page management processing 1030. Otherwise, home node hints are re-computed using the actual physical processor utilization and memory utilization levels as inputs for each shared memory partition 1050. As noted above, one embodiment for determining home node assignments is described below in relation to FIG. 11. Once the home node hints are re-computed for the shared memory partitions, then there is a re-determination of the desired quantity of physical pages for each shared memory partition in each node based on the current actual shared memory partition level pages 1055. The re-determined home node hints and desired quantity of physical pages for each shared memory partition are then employed by the dispatcher in dispatching physical processors and the hypervisor page manager in managing the memory of the shared memory partitions of the data processing system.

As noted, FIG. 11 depicts one embodiment of logic for assigning or determining home node(s) for each shared memory logical partition of the data processing system. Home node assignment begins 1100 with sorting the shared memory logical partitions (SMPs) in an order by which home nodes are to be chosen for the partitions 1105. For example, a priority level may be associated with the different partitions, such as by size, etc., which is taken into account in determining the order in which the home nodes are to be selected for the shared memory partitions. A determination is made whether the total desired memory for the shared memory partitions is greater than the available pool of physical memory 1110. Typically, in a shared memory partition data processing system, the requested logical memory will be larger than the available physical memory, and therefore, the logic needs to scale the desired memory amounts down so that the total desired memory is equivalent to the amount of available physical memory in the pool 1115. The variable P is then set to the first shared memory partition to be processed 1120. As shown, if the total desired logical memory is equal or less than the available physical memory, then the variable P is set directly from inquiry 1110. Next, the home node(s) for partition P is (are) chosen, fitting desired processor capacity (EC) and memory for partition P into the available processor capacity (EC) and physical memory of the nodes 1125. This step is essentially assigning the resources to the shared memory partitions. The available processor capacity (EC) and physical memory are decreased for the effected nodes based on the assignments to this particular shared memory partition 1130, and the logic determines whether all shared memory partitions of the system have been processed 1135. If "no", then the variable P is assigned to the next shared memory partition to be processed 1140 and home node(s) for the new partition P are chosen by fitting the desired processor capacity and memory for that partition into the remaining available processor capacity and memory of the nodes. Once all shared memory partitions have been processed, then home node assignment is completed, and the processing returns 1145 to, for example, the logic flow of FIGS. 10A & 10B.

Figure 12:
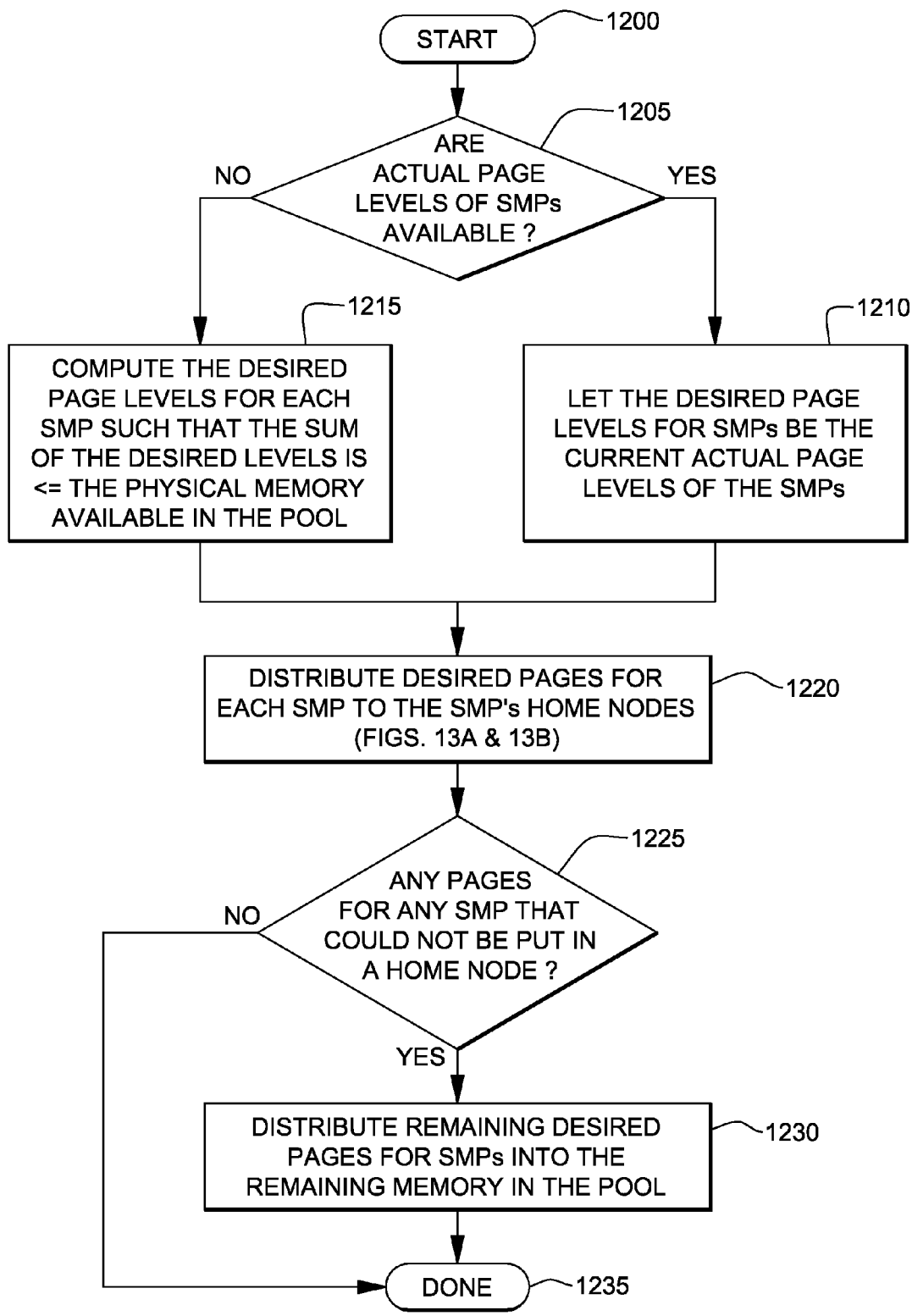
FIG. 12 is a flowchart of one embodiment of logic for determining a desired amount of physical pages per node for the shared memory partitions of a shared memory partition data processing system undergoing dynamic control of partition memory affinity, in accordance with an aspect of the present invention.
Figure 13A:
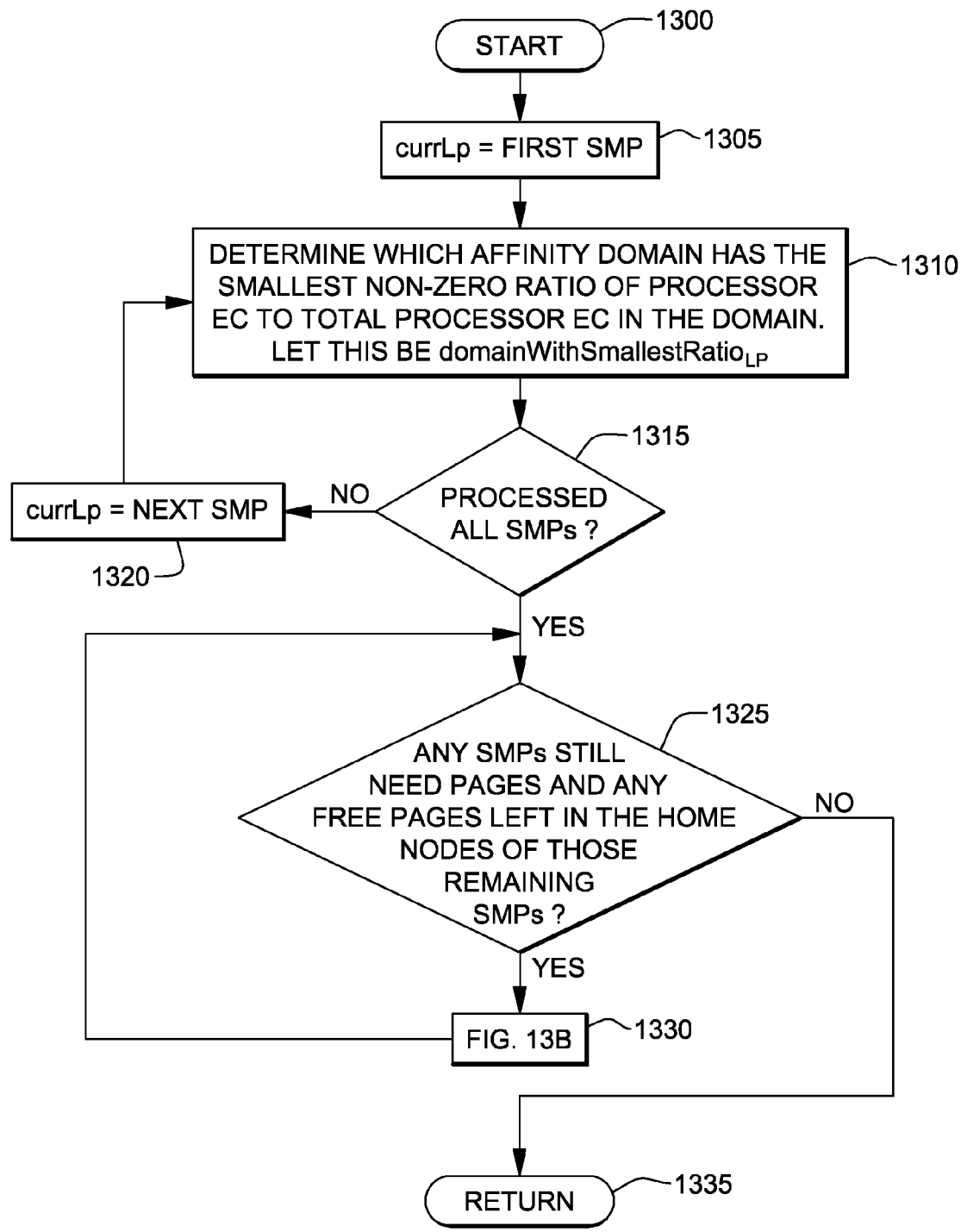
Figure 13B:
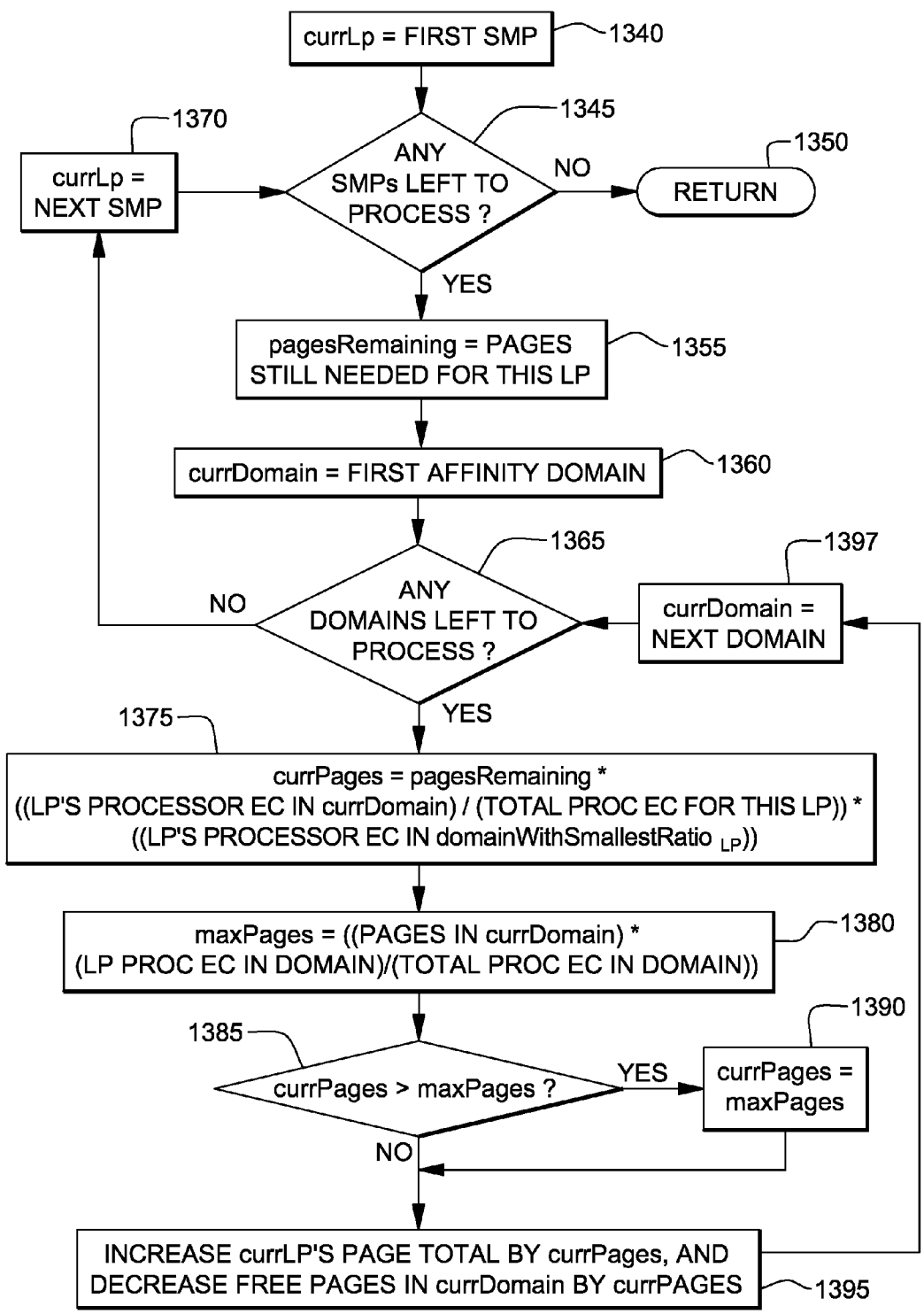

FIG. 12 depicts one embodiment of logic for determining a desired amount of physical pages for the shared memory partitions per node. This desired amount is referred to herein as the physical page level or physical page level target for the shared memory partition per node. The depicted logic is determining how much physical memory in each node should be assigned to each partition of the pool of shared memory partitions in the data processing system. The logic begins 1200 with a determination of whether actual physical page usage levels for the shared memory partitions are available 1205. This determination is based on the actual dynamic configuration information for the system. If "yes", then the desired page levels for the shared memory partitions are set to the current actual page levels of the shared memory partitions 1210. Otherwise, the desired page level for each shared memory partition is computed such that the sum of the desired page levels is less than or equal to the physical memory available in the shared memory pool of physical memory 1215. Once the desired mapping of each partition to physical memory is obtained, then the logic distributes the desired physical pages for each shared memory partition to the shared memory partition's home node(s) 1220. FIGS. 13A & 13B depict one detailed approach for distributing the desired physical pages to the assigned home nodes. Continuing with FIG. 12, the logic determines whether there are any pages for any shared memory partition that could not be placed in a home node for that partition 1225. If "yes", then the remaining desired pages for the shared memory partition are distributed into the remaining memory in the pool 1230. One approach for this remaining page distribution could be as set forth in the code below, wherein the word "domain" refers to a node and "SMP" refers to a shared memory partition. Once the remaining pages have been distributed, or if there are no remaining pages to be distributed, then the processing is complete 1235.

```
Repeat until done
    For each SMP still needing free pages:
        numUsableDomains = # of domains w/ free pages
        numPagesPerDomain = numRemainingForLp /
        numUsableDomains
        for each domain:
            numPagesToGive = numPagesPerDomain
            if (numPagesToGive > numPagesFreeInDomain)
                numPagesToGive = numPagesFreeInDomain
            if (numPagesToGive > num pages remaining for SMP)
                numPagesToGive = numPagesRemainingForSMP
            Add numPageToGive pages to SMP
            Remove numPagesToGive pages from free pages of domain
        end Foreach domain
    endForeach SMP
end repeat
```

FIGS. 13A & 13B depict one embodiment of logic for determining a desired physical page level target, including proportional page distribution with good affinity.

Referring first to FIG. 13A, at logic start time 1300, relevant data is known from system configuration and current memory/processor/node states for each shared memory logical partition in the pool of shared memory logical partitions of the data processing system. Variables employed by the logic flow of FIGS. 13A & 13B include:

| | |
|---|---|
| $EN_n$ = | the configured entitled processor capacity for $SMP_n$ |
| $weight_n$ = | the configured weight for SMP n, in the range 0 . . . 255 |
| $currMem_n$ = | configured current amount of memory for SMP n |
| poolMem = | total memory available in the memory pool |
| $availEC_a$ = | available entitled processor capacity in affinity node a |
| $availMem_a$ = | available memory in affinity node a |
| totalCurrMem = | $\Sigma(currMem_n)$ |
| $propMem_n$ = | $currMem_n$/totalCurrMem |
| $combinedWeight_n$ = | combined weigth for SMP n (i.e., a formula that factors together $weight_n$, $EC_n$, and $currMem_n$) |

The variable currLp is set to the first shared memory partition in the pool to be considered 1305. The logic determines which affinity domain or node has the smallest non-zero ratio of processor capacity (EC) to total processor entitled capacity in the domain (or node). This affinity domain (or node) is defined as $domainWithSmallestRatio_{LP}$ 1310. Logic then determines whether all shared memory partitions have been processed 1315, and if "no", then the variable currLp is set to the next shared memory partition of the pool of shared memory partitions to be processed 1320. Once all partitions have been processed, logic determines whether any shared memory partitions still require physical pages and whether there are any free physical pages left in the home node(s) of those remaining shared memory partitions 1325. Assuming that no shared memory partitions still require pages, processing returns 1335. Otherwise, the logic of FIG. 13B is employed, in one example, to proportionally distribute pages in a manner with good affinity 1330.

Referring to FIG. 13B, the variable currLp is set to a first shared memory partition to be considered 1340, and logic determines whether there are any partitions left to process 1345. If "no", then processing returns 1350. Assuming that there is a partition requiring additional page distribution, then the variable pagesRemaining is set to the pages still required for this logical partition 1355, and the variable currDomain is set to the first affinity domain (or node) in the pool of nodes to be examined 1360. The logic determines whether any domains (or nodes) are left to process 1365, and if "no", sets the variable currLp to a next partition to require additional proportional page distribution 1370. Assuming that there are domains or nodes left to be processed, then the logic determines for a particular partition the smallest non-zero ratio across the nodes, that is, the node with the smallest percentage of pages assigned to this logical partition 1375, and the maximum pages available in the current domain (or node) which could be assigned to the logical partition 1380. The logic then determines whether the amount of current pages required by the partition is greater than the maximum pages available for this partition 1385. If "yes", then the variable currPages is set to the maximum pages available for the partition 1390 and the logic increases the current logical partition's page total by the amount of its assigned current pages, and decreases the number of free pages in the current domain or node by the amount of current pages assigned to that logical partition 1395. Processing returns to consider a next node 1397 and repeats the process. This logic ensures that the pages are divided between the partitions based on the home node assignments, and only a certain number of pages are assigned for each pass through the processing.

To summarize, described hereinabove, in one embodiment, is an approach for determining home nodes for each shared memory partition virtual processor. The home nodes for a logical partition's virtual processors are a guide to the hypervisor to help match memory selection to the node(s) that have ideal or good affinity with the nodes where the partition's computations will typically occur.

Each virtual processor is assigned a single home node. If the physical processors from the home node are used for a partition's virtual processor computation, and the partition's memory pages come from the home node, affinity is maximized.

Consider the virtual processor for each partition in the pool. Classify the partition's virtual processors into sets that align with node boundaries (i.e., in a fashion that attempts to fit the entitled capacity of each partition into the fewest number of nodes), while also attempting to utilize the minimum number of nodes computed above. If the processor units cannot be classified so that both of these goals are met, it may be beneficial to assign home nodes so that the number of nodes used exceeds the minimal number of nodes computed above.

The home node assignment will be re-computed whenever a partition is added or removed from the shared memory pool, or when the entitled processor capacity of a partition in the pool changes.

Next a desired memory page level map for the shared memory pool is determined. The map can be ascertained given the set of home nodes for the shared partition's virtual processors, the set of nodes (including but possibly exceeding the set of home nodes) that the pool's shared memory pages will reside in, and the target number of pages that each partition should be given. This map represents target page levels that the hypervisor should attempt to attain as pages are given out to and taken away from partitions over time.

The page levels for a given partition or node P will depend on the proportion of the node's processing units devoted to the pool's partitions, and the number of shared pool pages contained in the node. The starting point for P would be the number of pool pages in the node that is proportional to the number of shared processor units in the node for the partition. Depending on the current target pages for the partitions that have virtual processors with home nodes in the current node, this starting point may be below the desired level. If the sum of the proportional page values P for all partitions with home node virtual processors in this node is less than the pages available in the node, the page levels for the partitions of interest can be increased (in a fashion that attempts to conform to the processor distribution ratio), until the shared page count for the node has been hit, or the partitions' target page levels have been met. Additional partition page levels that cannot fit in the home nodes (with best affinity) can be targeted to other nodes in the pool, prioritized by affinity with the home nodes if there are multiple levels of affinity on the platform, or distributed in some other fashion (e.g., round-robin).

This map may be dynamically maintained, with levels re-computed periodically to reflect the current target page levels suggested by the hypervisor's paging/ballooning algorithms. By continually re-calibrating the mapping of page levels, the overall shared pool affinity will keep up with changes in the demands of the pool's partitions. For example, if a partition becomes dormant and stops needing pages, the hypervisor will detect the drop in paging demand and likely would choose to reduce that partition's overall target page level, which would feed back into the mapping computation, allowing other partitions which shared home nodes with the dormant partition to have higher target page levels in their desired nodes with a corresponding expected increase in affinity.

As noted, the logic can dynamically adjust the home node assignment(s) to keep up with current processor and memory activity metrics. Assignment of partition virtual processors to home nodes can potentially be optimized by taking processor and memory activity metrics into account. By packing the home nodes of virtual processors for the busiest partitions (i.e., partitions that are accessing memory most frequently) into a smaller set of nodes, the partitions may experience better affinity as shared pages are given out and taken back by the pool To estimate the partition memory activity level, the hypervisor might use a metric based on average processor utilization, average pool page fault rate, average partition page fault rate, or any combination of those and whatever other related statistics are available.

Alternatively, if the combined overall target page levels for busy partitions with overlapping home nodes far exceeds the shared pages available on the nodes, it would likely be beneficial to reassign the home nodes for the busy partitions so that they are on separate nodes. Doing so would increase the proportion of each partition's target page levels that would be in their processors' home nodes.

Any change to the home node assignment would result in a re-computation of the target page level map so that the hypervisor could, over time, adapt the pool to the new desired page levels.

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402; "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; "Controlled Shut-Down of Partitions Within a Shared Memory Partition Data Processing System", U.S. Ser. No. 12/403,472; and "Managing Migration of a Shared Memory Logical Partition from a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 14:
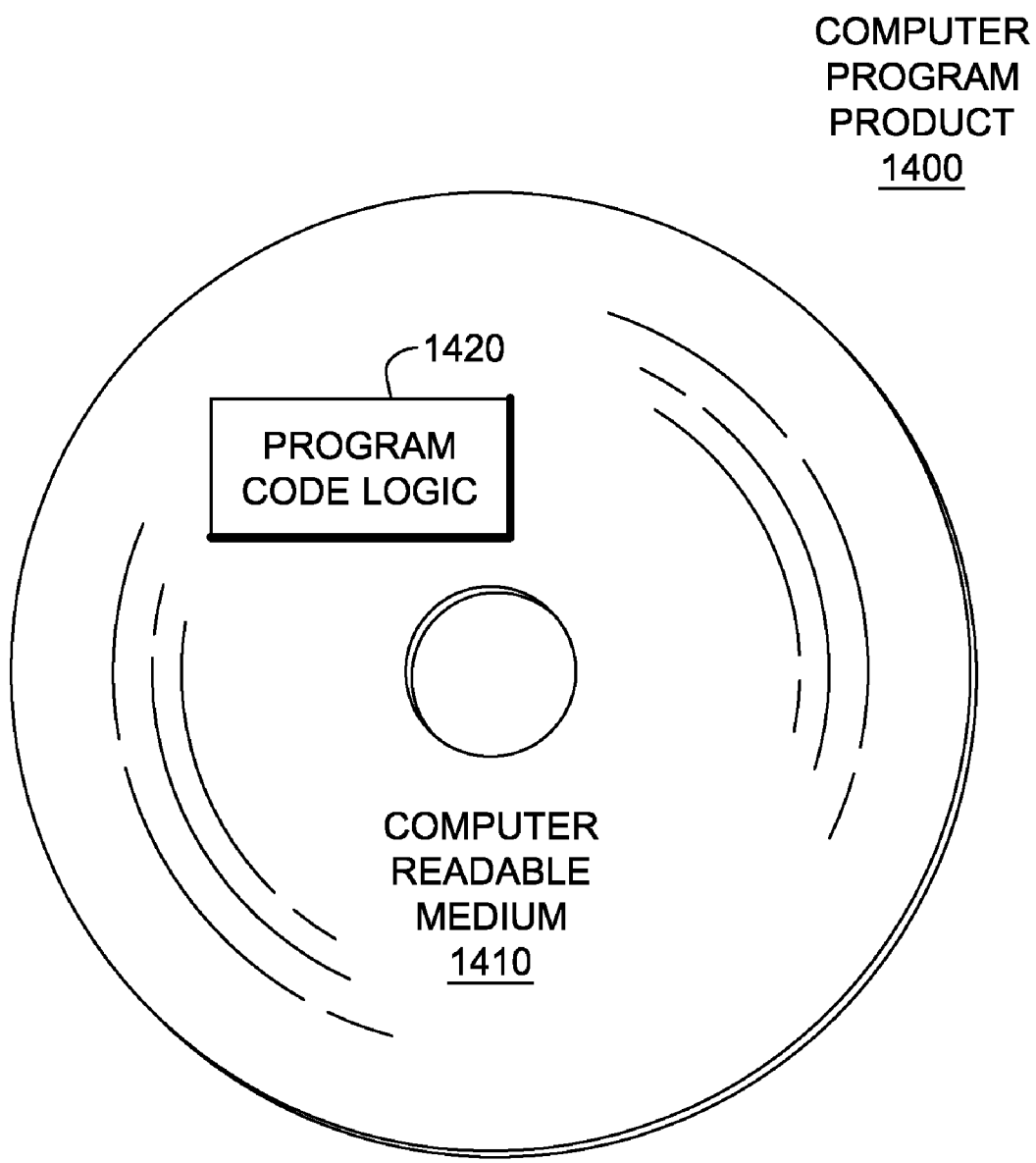
FIG. 14 depicts one embodiment of an article of manufacture or computer program product incorporating one or more aspects of the present invention.

One example of an article of manufacture or a computer program product incorporating one or more aspects of the present invention is described with reference to FIG. 14. A computer program product 1400 includes, for instance, one or more computer-readable media 1410 to store computer readable program code means or logic 1420 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of dynamically controlling memory affinity of a shared memory logical partition, the method comprising:

determining at least one home node assignment for a shared memory logical partition of a plurality of shared memory logical partitions in a shared memory partition data processing system, the plurality of shared memory logical partitions of the shared memory partition data processing system sharing availability of a defined amount of memory in a shared pool of physical memory absent concurrent access to any physical page of the physical memory, the shared memory logical partition running on a plurality of nodes of the shared memory partition data processing system, with each assigned home node being one node of the plurality of nodes;

determining a desired physical page level per node for the shared memory logical partition;

allowing the shared memory partition to run and using the at least one home node assignment and its desired physical page levels for the plurality of nodes in the dispatching of tasks to physical processors in the plurality of nodes and in hypervisor page memory management to dynamically control memory affinity of the shared memory logical partition in the shared memory partition data processing system; and further comprising, after allowing the shared memory logical partition to run for a period of time, re-determining the at least one home node assignment for the shared memory logical partition, and re-determining the desired physical page level per node for the shared memory logical partition running on the plurality of nodes wherein the re-determining of the at least one home node assignment employs actual physical processor utilization and memory utilization of the shared memory logical partition as input, and the re-determining of the desired physical page levels is based, in part, on current actual shared memory partition page levels for the shared memory logical partition across the plurality of nodes, and wherein the method further comprises employing the re-determined at least one home node assignment and the re-determined desired physical page levels in dispatching of tasks to physical processors, and in hypervisor page memory management within the shared memory partition data processing system.

2. The computer-implemented method of claim 1, wherein the allowing further comprises collecting actual physical processor utilization statistics and memory usage levels for the shared memory logical partition of the shared memory partition data processing system while a plurality of shared memory logical partitions of the shared memory partition data processing system run on the plurality of nodes.

3. The computer-implemented method of claim 1, wherein the re-determining of the at least one home node assignment and the re-determining of the desired physical page level per node for the shared memory logical partition occur responsive to a configuration change in the shared memory logical partition or to detection of actual physical processor and memory utilization proportions for the shared memory logical partition which differ by a defined threshold from previously determined physical processor and memory utilization proportions for the shared memory logical partition.

4. The computer-implemented method of claim 1, further comprising determining at least one home node assignment for each shared memory logical partition of the plurality of shared memory logical partitions of the shared memory partition data processing system, and determining a desired physical page level per node for each shared memory logical partition of the plurality of shared memory logical partitions, and wherein the allowing comprises allowing the plurality of shared memory logical partitions to run and using the assigned home nodes and desired physical page levels for the plurality of nodes in dispatching of tasks of the plurality of shared memory logical partitions to physical processors in the plurality of nodes and in hypervisor page memory management to dynamically concurrently control memory affinity of the plurality of shared memory logical partitions of the shared memory partition data processing system.

5. The computer-implemented method of claim 4, wherein the determining of the at least one home node assignment for each shared memory logical partition further comprises initially sorting the plurality of shared memory logical partitions in order of priority for which home nodes are to be assigned, and determining whether total desired logical memory for the plurality of shared memory logical partitions is greater than available physical memory in the shared pool of physical memory of the shared memory partition data processing system, and if yes, scaling the desired logical memory down so that the total desired logical memory of the plurality of shared memory logical partitions is equivalent to the amount of physical memory in the shared pool, and assigning for a highest priority shared memory logical partition at least one home node for that shared memory logical partition, fitting its desired, entitled processor capacity and memory into the available processor capacity and memory of the plurality of nodes, and proceeding to process each shared memory logical partition in the order of priority until all shared memory logical partitions have at least one home node assigned.

6. The computer-implemented method of claim 4, wherein determining the desired physical page level per node for each shared memory logical partition comprises determining whether actual page level utilization for the shared memory logical partitions are available, and if yes, then setting the desired physical page levels for each shared memory logical partition to be its actual page level utilization, otherwise, determining a desired physical page level for the shared memory logical partition such that the sum of the desired physical page levels for the plurality of shared memory logical partitions is less than or equal to the available physical memory in the shared pool of physical memory and distributing desired physical pages for each shared memory logical partition to that shared memory logical partition's at least one assigned home node.

7. The computer-implemented method of claim 6, wherein the distributing further comprises determining whether any remaining desired physical page(s) for any shared memory logical partition could not be put in the at least one assigned home node for that shared memory logical partition, and if so, distributing the remaining desired physical page(s) for the shared memory logical partition to remaining physical memory of the shared pool associated with at least one other node of the plurality of nodes.

8. A computing environment comprising:
a shared memory partition data processing system comprising a plurality of physical processors and associated memory disposed in a plurality of nodes, the shared memory partition data processing system further comprising a plurality of shared memory logical partitions running on the plurality of nodes, the plurality of shared memory logical partitions of the shared memory partition data processing system sharing availability of a defined amount of memory in a shared pool of physical memory absent concurrent access to any physical page of the physical memory, the shared memory partition data processing system also comprising logic for:
determining at least one home node assignment for a shared memory logical partition of the plurality of shared memory logical partitions, wherein each assigned home node is one node of the plurality of nodes;
determining a desired physical page level per node for the shared memory logical partition;
allowing the shared memory logical partition to run and using the at least one home node assignment and its desired physical page levels for the plurality of nodes in the dispatching of tasks to physical processors in the plurality of nodes and in hypervisor page memory management to dynamically control memory affinity of the shared memory logical partition in the shared memory partition data processing system; and
wherein the logic further comprises, after allowing the shared memory logical partition to run for a period of time, re-determining the at least one home node assignment for the shared memory logical partition, and re-determining the desired physical page level per node for the shared memory logical partition running on the plurality of nodes, wherein the re-determining of the at least one home node assignment employs actual physical processor utilization and memory utilization of the shared memory logical partition as input, and the re-determining of the desired physical page levels is based, in part, on current actual memory partition page levels for the shared memory partition across the plurality of nodes, and wherein the logic further comprises employing the re-determined at least one home node assignment and the re-determined desired physical page levels in dispatching of tasks to physical processors in the plurality of nodes, and in hypervisor page memory management within the shared memory partition data processing system.

9. The computing environment of claim 8, wherein the allowing further comprises collecting actual physical processor utilization statistics and memory usage levels for the shared memory logical partition of the shared memory partition data processing system while a plurality of shared memory logical partitions of the shared memory partition data processing system run on the plurality of nodes.

10. The computing environment of claim 8, wherein the re-determining of the at least one home node assignment and the re-determining of the desired physical page level per node for the shared memory logical partition occur responsive to a configuration change in the shared memory logical partition or to detection of actual physical processor and memory utilization proportions for the shared memory logical partition which differ by a defined threshold from previously determined physical processor and memory utilization proportions for the shared memory logical partition.

11. The computing environment of claim 8, further comprising determining at least one home node assignment for each shared memory logical partition of the plurality of shared memory logical partitions of the shared memory partition data processing system, and determining a desired physical page level per node for each shared memory logical partition of the plurality of shared memory logical partitions, and wherein the allowing comprises allowing the plurality of shared memory logical partitions to run and using the assigned home nodes and desired physical page levels for the plurality of nodes in dispatching of tasks of the plurality of shared memory logical partitions to physical processors in the plurality of nodes and in hypervisor page memory management to dynamically concurrently control memory affinity of the plurality of shared memory logical partitions of the shared memory partition data processing system.

12. The computing environment of claim 11, wherein the determining of the at least one home node assignment for each shared memory logical partition further comprises initially sorting the plurality of shared memory logical partitions in order of priority for which home nodes are to be assigned, and determining whether total desired logical memory for the plurality of shared memory logical partitions is greater than available physical memory in the shared pool of physical memory of the shared memory partition data processing system, and if yes, scaling the desired logical memory down so that the total desired logical memory of the plurality of shared memory logical partitions is equivalent to the amount of physical memory in the shared pool, and assigning for a highest priority shared memory logical partition at least one home node for that shared memory logical partition, fitting its desired, entitled processor capacity and memory into the available processor capacity and memory of the plurality of nodes, and proceeding to process each shared memory logical partition in the order of priority until all shared memory logical partitions have at least one home node assigned.

13. The computing environment of claim 11, wherein determining the desired physical page level per node for each shared memory logical partition comprises determining whether actual page level utilization for the shared memory logical partitions are available, and if yes, then setting the desired physical page levels for each shared memory logical partition to be its actual page level utilization, otherwise, determining a desired physical page level for the shared memory logical partition such that the sum of the desired physical page levels for the plurality of shared memory partitions is less than or equal to the available physical memory in the shared pool of physical memory and distributing desired physical pages for each shared memory logical partition to that shared memory logical partition's at least one assigned home node.

14. An article of manufacture comprising:
at least one non-transitory computer-readable medium having computer-readable program code logic to dynamically control memory affinity of a shared memory logical partition, the computer-readable program code logic when executing on a processor performing:
determining at least one home node assignment for a shared memory logical partition of a plurality of shared memory logical partitions in a shared memory partition data processing system, the plurality of shared memory logical partitions of the shared memory partition data processing system sharing availability of a defined amount of memory in a shared pool of physical memory absent concurrent access to any physical page of the physical memory, the shared memory logical partition running on a plurality of nodes of the shared memory partition data processing system, with each assigned home node being one node of the plurality of nodes;
determining a desired physical page level per node for the shared memory logical partition;
allowing the shared memory partition to run and using the at least one home node assignment and its desired physical page levels for the plurality of nodes in the dispatching of tasks to physical processors in the plurality of nodes and in hypervisor page memory management to dynamically control memory affinity of the shared memory logical partition in the shared memory partition data processing system; and
further comprising, after allowing the shared memory logical partition to run for a period of time, re-determining the at least one home node assignment for the shared memory logical partition, and re-determining the desired physical page level per node for the shared memory logical partition running on the plurality of nodes, wherein the re-determining of the at least one home node assignment employs actual physical processor utilization and memory utilization of the shared memory logical partition as input, and the re-determining of the desired physical page levels is based, in part, on current actual shared memory partition page levels for the shared memory logical partition across the plurality of nodes, and wherein the computer-readable program code logic when executing on the processor further performs employing the re-determined at least one home node assignment and the re-determined desired physical page levels in dispatching of tasks to physical processors in the plurality of nodes, and in hypervisor page memory management within the shared memory partition data processing system.

15. The article of manufacture of claim 14, wherein the allowing further comprises collecting actual physical processor utilization statistics and memory usage levels for the shared memory logical partition of the shared memory partition data processing system while a plurality of shared memory logical partitions of the shared memory partition data processing system run on the plurality of nodes.

16. The article of manufacture of claim 14, wherein the re-determining of the at least one home node assignment and the re-determining of the desired physical page level per node for the shared memory logical partition occur responsive to a configuration change in the shared memory logical partition or to detection of actual physical processor and memory utilization proportions for the shared memory logical partition which differ by a defined threshold from previously determined physical processor and memory utilization proportions for the shared memory logical partition.

17. The article of manufacture of claim 14, further comprising determining at least one home node assignment for each shared memory logical partition of the plurality of shared memory logical partitions of the shared memory partition data processing system, and determining a desired physical page level per node for each shared memory logical partition of the plurality of shared memory logical partitions, and wherein the allowing comprises allowing the plurality of shared memory logical partitions to run and using the assigned home nodes and desired physical page levels for the plurality of nodes in dispatching of tasks of the plurality of shared memory logical partitions to physical processors in the plurality of nodes and in hypervisor page memory management to dynamically concurrently control memory affinity of the plurality of shared memory logical partitions of the shared memory partition data processing system.

18. The article of manufacture of claim 17, wherein the determining of the at least one home node assignment for each shared memory logical partition further comprises initially sorting the plurality of shared memory logical partitions in order of priority for which home nodes are to be assigned, and determining whether total desired logical memory for the plurality of shared memory logical partitions is greater than available physical memory in the shared pool of physical memory of the shared memory partition data processing system, and if yes, scaling the desired logical memory down so that the total desired logical memory of the plurality of shared memory logical partitions is equivalent to the amount of physical memory in the shared pool, and assigning for a highest priority shared memory logical partition at least one home node for that shared memory logical partition, fitting its desired, entitled processor capacity and memory into the available processor capacity and memory of the plurality of nodes, and proceeding to process each shared memory logical partition in the order of priority until all shared memory logical partitions have at least one home node assigned.

* * * * *